United States Patent
Tse et al.

(10) Patent No.: US 11,941,244 B1
(45) Date of Patent: Mar. 26, 2024

(54) PRESENTING SUGGESTIONS FROM SEARCH CORPORA

(71) Applicant: GOOGLE LLC, Mountain View, CA (US)

(72) Inventors: Alastair Tse, Killara (AU); John Nicholas Jitkoff, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/959,084

(22) Filed: Oct. 3, 2022

Related U.S. Application Data

(63) Continuation of application No. 16/863,537, filed on Apr. 30, 2020, now Pat. No. 11,461,003, which is a continuation of application No. 15/903,849, filed on Feb. 23, 2018, now Pat. No. 10,678,429, which is a continuation of application No. 14/740,932, filed on Jun. 16, 2015, now Pat. No. 9,933,938, which is a continuation of application No. 12/501,079, filed on Jul. 10, 2009, now Pat. No. 9,086,775.

(60) Provisional application No. 61/079,801, filed on Jul. 10, 2008.

(51) Int. Cl.
| | |
|---|---|
| *G06F 3/04886* | (2022.01) |
| *G06F 3/048* | (2013.01) |
| *G06F 3/04842* | (2022.01) |
| *G06F 16/951* | (2019.01) |
| *G06F 16/957* | (2019.01) |

(52) U.S. Cl.
CPC .......... *G06F 3/04886* (2013.01); *G06F 3/048* (2013.01); *G06F 3/04842* (2013.01); *G06F 16/951* (2019.01); *G06F 16/957* (2019.01)

(58) Field of Classification Search
CPC .. G06F 3/04886; G06F 3/048; G06F 3/04842; G06F 16/951; G06F 16/957
See application file for complete search history.

(56) References Cited

U.S. PATENT DOCUMENTS

| | | | |
|---|---|---|---|
| 6,633,873 B1 | 10/2003 | Nakamura | |
| 6,751,630 B1 | 6/2004 | Franks et al. | |
| 7,219,090 B2 | 5/2007 | Travis, Jr. | |
| 7,330,846 B1 | 2/2008 | Dirisala et al. | |
| 7,437,370 B1 * | 10/2008 | Ershov | G06F 16/951 |
| 7,536,713 B1 | 5/2009 | Bartholomew | |
| 7,565,425 B2 | 7/2009 | Van Vleet et al. | |

(Continued)

OTHER PUBLICATIONS

"Quick Way to Hide Keyboard," published Nov. 25, 2008; http://forumns.cmckberry.com/blackberry-storm-f86/quick-way-hide-keyboard-103108; dated Nov. 25, 2008.

(Continued)

*Primary Examiner* — Pei Yong Weng
(74) *Attorney, Agent, or Firm* — Gray Ice Higdon

(57) ABSTRACT

The subject matter of this specification can be implemented in, among other things, a computer-implemented user interface method including displaying on a touchscreen display a representation of a keyboard defining a top edge and a bottom edge, and a content area adjacent to the keyboard. The method further includes receiving a user dragging input having motion directed to the bottom edge of the keyboard. The method further includes removing the keyboard from the touchscreen display and expanding the content area to an area previously occupied by the keyboard.

27 Claims, 17 Drawing Sheets

(56) References Cited

U.S. PATENT DOCUMENTS

| | | | |
|---|---|---|---|
| 7,630,972 B2 | 12/2009 | Ott et al. |
| 7,657,493 B2 | 2/2010 | Meijer et al. |
| 7,668,809 B1 | 2/2010 | Kelly et al. |
| 7,679,534 B2 | 3/2010 | Kay et al. |
| 7,716,201 B2 | 5/2010 | Joshi |
| 7,743,051 B1 | 6/2010 | Kashyap et al. |
| 7,797,375 B2 | 9/2010 | Vincent |
| 7,831,559 B1 | 11/2010 | Mohan et al. |
| 7,844,590 B1 | 11/2010 | Zwicky et al. |
| 7,890,514 B1 | 2/2011 | Mohan et al. |
| 7,890,961 B2 | 2/2011 | Whittle et al. |
| 7,930,197 B2 | 4/2011 | Ozzie et al. |
| 7,934,224 B2 | 4/2011 | Pomeroy et al. |
| 7,958,234 B2 | 6/2011 | Thomas et al. |
| 7,991,886 B1 | 8/2011 | Wu |
| 8,001,003 B1 | 8/2011 | Robinson et al. |
| 8,005,816 B2 | 8/2011 | Krishnaprasad et al. |
| 8,019,648 B2 | 9/2011 | King et al. |
| 8,037,041 B2 | 10/2011 | Gupta |
| 8,065,286 B2 | 11/2011 | Jones |
| 8,065,453 B2 | 11/2011 | Fux |
| 8,086,604 B2 | 12/2011 | Arrouye et al. |
| 8,108,389 B2 | 1/2012 | Bobick et al. |
| 8,171,483 B2 | 5/2012 | Nord et al. |
| 8,239,375 B2 | 8/2012 | Bocking et al. |
| 9,086,775 B1 | 7/2015 | Tse et al. |
| 9,933,938 B1 | 4/2018 | Tse et al. |
| 10,678,429 B1 | 6/2020 | Tse et al. |
| 2003/0074400 A1 | 4/2003 | Brooks et al. |
| 2004/0003351 A1 | 1/2004 | Sommerer et al. |
| 2004/0143569 A1* | 7/2004 | Gross ................ G06F 16/332 |
| 2005/0080786 A1 | 4/2005 | Fish et al. |
| 2005/0149512 A1 | 7/2005 | Ruthfield et al. |
| 2005/0228780 A1 | 10/2005 | Diab et al. |
| 2005/0228788 A1 | 10/2005 | Dahn et al. |
| 2005/0283468 A1 | 12/2005 | Kamvar et al. |
| 2006/0033724 A1 | 2/2006 | Chaudhri et al. |
| 2006/0106769 A1 | 5/2006 | Gibbs |
| 2006/0149734 A1 | 7/2006 | Egnor et al. |
| 2007/0038610 A1 | 2/2007 | Omoigui |
| 2007/0043704 A1 | 2/2007 | Raub et al. |
| 2007/0088687 A1 | 4/2007 | Bromm et al. |
| 2007/0088801 A1 | 4/2007 | Levkovitz et al. |
| 2007/0118520 A1 | 5/2007 | Bliss et al. |
| 2007/0136264 A1 | 6/2007 | Tran |
| 2007/0150496 A1 | 6/2007 | Feinsmith |
| 2007/0162481 A1 | 7/2007 | Millett |
| 2007/0192179 A1 | 8/2007 | Van Luchene |
| 2007/0288648 A1 | 12/2007 | Mehanna et al. |
| 2008/0052945 A1 | 3/2008 | Matas et al. |
| 2008/0057922 A1 | 3/2008 | Kokes et al. |
| 2008/0122796 A1 | 5/2008 | Jobs et al. |
| 2008/0133505 A1 | 6/2008 | Bayley et al. |
| 2008/0168039 A1* | 7/2008 | Carpenter ............. G06F 16/957 |
| 2008/0243783 A1 | 10/2008 | Santi et al. |
| 2008/0275846 A1 | 11/2008 | Almas |
| 2008/0281904 A1 | 11/2008 | Conrad et al. |
| 2008/0301190 A1 | 12/2008 | Lockhart et al. |
| 2008/0316183 A1 | 12/2008 | Westerman et al. |
| 2009/0006543 A1 | 1/2009 | Smit |
| 2009/0029687 A1 | 1/2009 | Ramer et al. |
| 2009/0043789 A1 | 2/2009 | Gupta |
| 2009/0094562 A1 | 4/2009 | Jeong et al. |
| 2009/0111487 A1 | 4/2009 | Scheibe |
| 2009/0265388 A1 | 10/2009 | Xiao et al. |
| 2009/0300008 A1 | 12/2009 | Hangartner et al. |
| 2009/0313220 A1 | 12/2009 | Best et al. |
| 2010/0110012 A1 | 5/2010 | Maw |
| 2010/0131584 A1 | 5/2010 | Johnson |
| 2011/0055185 A1 | 3/2011 | Bitan et al. |
| 2011/0055256 A1 | 3/2011 | Phillips et al. |
| 2015/0347428 A1 | 12/2015 | Kisin et al. |

OTHER PUBLICATIONS

Manber, Udi and Bigot, Peter A., "The Search Broker", Proceedings of the USENIX Symposium on Internet Technologies and Systems, Monterey, California, Dec. 1997, 10 pages,, dated Dec. 1997.

* cited by examiner

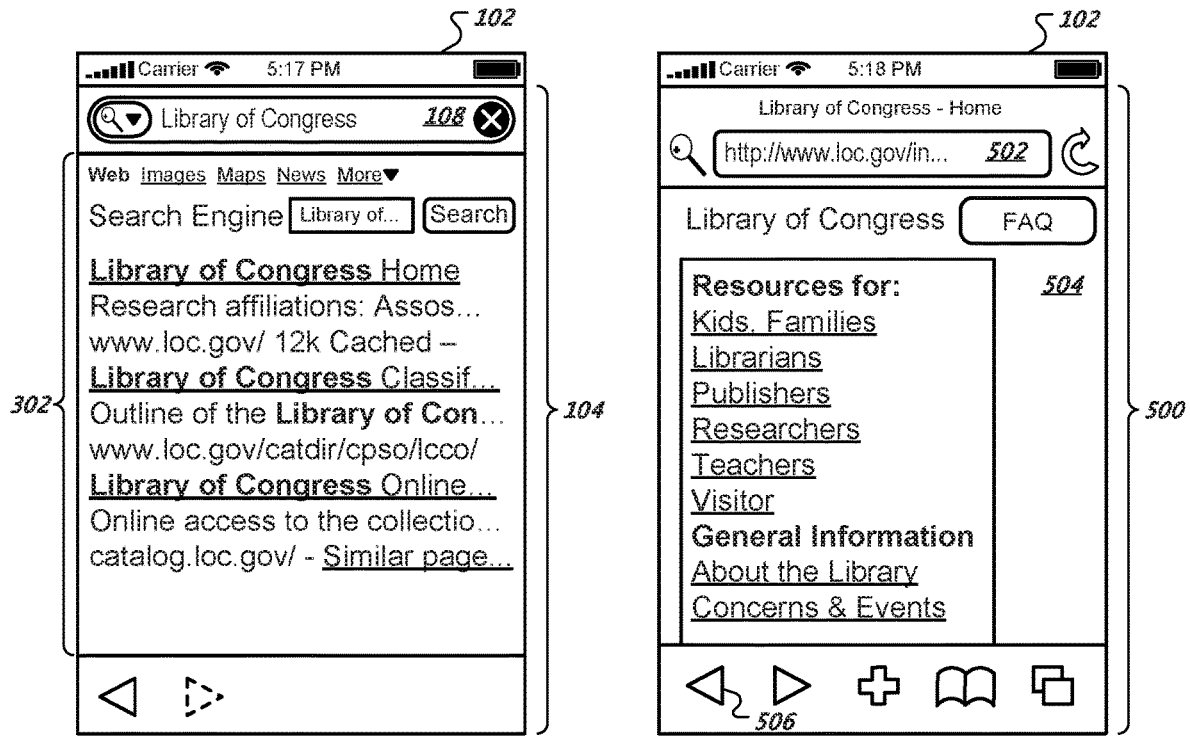
FIG. 5A
FIG. 5B
FIG. 5C

PRESENTING SUGGESTIONS FROM SEARCH CORPORA

BACKGROUND

This specification relates to minimizing a software based keyboard on a mobile computing device.

More and more, people spend their time interacting with electronic devices—whether in the form of desktop computers, set-top television boxes, mobile devices such as smartphones, or other such devices. People like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, four-directional keypads, and other such input mechanisms.

Fine distinctions in user interfaces can make a world of difference in a user's experience with a device. User interface options may be reduced for mobile devices, where full-sized keyboards are not available or no keyboards are available. In such situations, intuitive interaction may be at a premium. The importance of such interaction may be even more pronounced with mobile devices, where the user may need to interact with a device using a single hand or just a few fingers.

SUMMARY

In general, this document describes minimizing a software based keyboard on a mobile computing device. In a first aspect, a computer-implemented user interface method includes displaying on a touchscreen display a representation of a keyboard defining a top edge and a bottom edge, and a content area adjacent to the keyboard. The method further includes receiving a user dragging input having motion directed to the bottom edge of the keyboard. The method further includes removing the keyboard from the touchscreen display and expanding the content area to an area previously occupied by the keyboard.

Implementations can include any, all, or none of the following features. The keyboard can be generated by an operating system on a device, and the content area can be provided by an application program on the device. The dragging input can begin in the content area and trigger removal of the keyboard when the dragging input reaches a defined area or a defined distance. The dragging input can trigger removal of the keyboard when the dragging input reaches a side of the keyboard that is closest to the content area. The method can include altering the appearance of the keyboard during the dragging input. Altering the appearance of the keyboard can include sliding the keyboard downward on the touchscreen display. Altering the appearance of the keyboard can include compressing the keyboard in a vertical dimension. The method can include after removing the keyboard, receiving a user selection associated with a text entry area and automatically re-displaying the keyboard in response to the user input. The keyboard can be displayed immediately adjacent to the content area. The method can include displaying a plurality of user-selectable controls between the keyboard and the content area. The user-selectable controls display search suggestions responsive to text already entered in the content area by the user, and selection of a control causes the display to show content associated with the suggestion. The content area can include a search query entry box.

In a second aspect, a computer-readable data storage medium storing computer-executable instructions that, when executed, perform actions including displaying on a touchscreen display a representation of a keyboard defining a top edge and a bottom edge, and a content area adjacent to the keyboard. The actions further include receiving a user dragging input having motion directed to the bottom edge of the keyboard. The actions further include removing the keyboard from the touchscreen display and expanding the content area to an area previously occupied by the keyboard.

Implementations can include any, all, or none of the following features. The keyboard can be generated by an operating system on a device, and the content area can be provided by an application program on the device. The dragging input can begin in the content area and trigger removal of the keyboard when the dragging input reaches a defined area or a defined distance. The dragging input can trigger removal of the keyboard when the dragging input reaches a side of the keyboard that is closest to the content area. The actions can further include altering the appearance of the keyboard during the dragging input. Altering the appearance of the keyboard can include sliding the keyboard downward on the touchscreen display. Altering the appearance of the keyboard can include compressing the keyboard in a vertical dimension. The actions can further include after removing the keyboard, receiving a user selection associated with a text entry area and automatically re-displaying the keyboard in response to the user input. The keyboard can be displayed immediately adjacent to the content area. The actions can further include displaying a plurality of user-selectable controls between the keyboard and the content area. The user-selectable controls can display search suggestions responsive to text already entered in the content area by the user, and selection of a control can cause the display to show content associated with the suggestion. The content area can include a search query entry box.

In a third aspect, a computer-implemented system includes an operating system component adapted to display on a touchscreen a representation of a keyboard upon a request of an application. The system further includes a search application running in the operating system to receive user search queries and cause the display of search results. The search application is programmed to interpret dragging motions on the touchscreen and to signal to the operating system for hiding of the keyboard representation in response to dragging motions that match a predefined signature.

Implementations can include any, all, or none of the following features. The predefined signature can include a dragging input that begins in the content area and triggers removal of the keyboard when the dragging input reaches a defined area or a defined distance. The dragging input triggers removal of the keyboard when the dragging input reaches a side of the keyboard that can be closest to the content area. The search application can be operable to provide input to the operating system to alter the appearance of the keyboard during the dragging input. Altering the appearance of the keyboard can include sliding the keyboard downward on the touchscreen display. Altering the appearance of the keyboard can include compressing the keyboard in a vertical dimension. The search application can be programmed to signal the operating system for re-display of the keyboard, after the keyboard has been hidden, in response to a user selection associated with a text entry area for the search application. The keyboard can be displayed immediately adjacent to the content area.

In a fourth aspect, a computer-implemented system includes an operating system component adapted to display on a touchscreen a representation of a keyboard upon a request of an application. The system further includes a search application running in the operating system to receive user search queries and cause the display of search results. The system further includes means for causing the keyboard to be hidden in response to user inputs on the touchscreen.

The systems and techniques described here may provide one or more of the following advantages. First, a system can provide results before a user has fully entered a query, and may thus permit the user to short-circuit a full query entry if they see information that is particularly relevant to them before they have had to enter the entire query. Also, a system can provide for improved search interaction by using a native search application that can provide more power than a search application running in a web browser, but may integrate well with the web browser. The system may also permit a user to be provided with improved search results by logging interaction data, where the user has consented, and using such data to personalize or otherwise improve the manner in which search results are presented to the user. Moreover, the search application described here, and other applications, may be personalized to a group to which the user belongs so that when the user requests to have the application installed on his or her computing device, the application may be installed in a manner that is customized to the group. Such a technique may provide particular advantages to corporations that use hosted software applications. Moreover, where query entry occurs via an on screen keyboard, the techniques described here may provide an intuitive mechanism by which the user may remove the keyboard from the screen when it is not needed, and may thus increase the area for the display of search results and similar content.

The details of one or more implementations of the interactive search querying feature and other features are set forth in the accompanying drawings and the description below. Other features and advantages will be apparent from the description and drawings, and from the claims.

DESCRIPTION OF DRAWINGS

FIGS. 5A-5C show examples of user interfaces for navigating to a web page and back to a search application.

Like reference symbols in the various drawings indicate like elements.

DETAILED DESCRIPTION

This document describes systems and techniques for interactive search querying. Using a mobile computing device, a user inputs a search query. The mobile computing device presents search suggestions to the user as the user inputs the query, and can also present search results, where the suggestions and the results are responsive to search queries that correspond to a partial search query (i.e., where the user has not indicated an intent to submit a complete query, such as by pressing an "enter" key). In some implementations, one or more operations of the interactive search querying are performed by a search server in communication with the mobile computing device. For example, the search server and the mobile computing device can be in communication over a network such as a wireless network and/or the Internet.

Figure 1A:
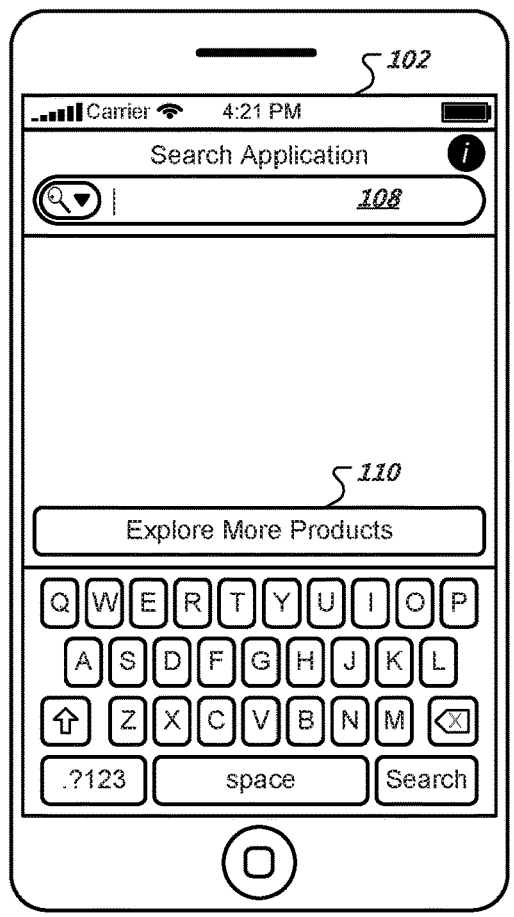
FIGS. 1A-1D show examples of a mobile computing device and a user interface for interactive search querying.

FIG. 1A shows an example of a mobile computing device 100 and a user interface 102 for interactive search querying. The mobile computing device 100 includes or has access to one or more corpora (not shown) of searchable information. For example, corpora can include contacts in an address book, bookmarks (e.g., favorites) for a browser application, a web browsing history from a browser application, previous search queries performed, and websites to name a few. The user interface 102 displays a search application 104 for searching within the corpora. The search application 104 provides suggestions in response to search query inputs made by the user.

The user interface 102 also displays a user input area 106. In the example shown here, the user input area 106 is a keyboard implemented within a touch screen display. In some implementations, the user input area 106 can include hardware for making search query inputs, such as buttons. In another implementation, the user can interact with a keyboard displayed on a screen using a pointing device, such as a dial or a track ball.

The search application 104 includes a search query input area 108. The user makes selections in the user input area 106 to make an input in the search query input area 108. Alternatively, the user can select an "Explore More Products" button 110 to initiate other applications. The areas outside the keyboard may be termed a content area, as they display content for interaction with a user when the user is performing searches and reviewing the results of the searches. In FIG. 1A the user has not yet started entering a query into the mobile computing device 100.

Figure 1B:
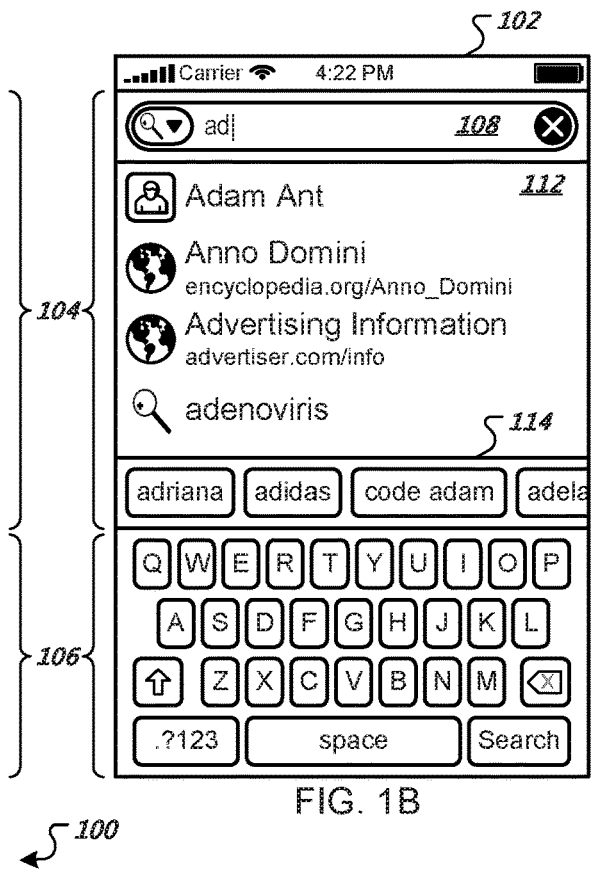

FIG. 1B shows the user interface 102 after the user has made an input in the search query input area 108. Here, the user has made an input that includes a portion of a particular search query including the letters "ad." As the user makes the search query input, the search application 104 updates a corpora suggestions area 112 with suggestions from the corpora having items that are related to the search input "ad."

In particular, in response to the search input "ad," the search application 104 updates the corpora suggestions area 112 to include suggestions for "Adam Ant," "Anno Domini," "Advertising Information," and "adenoviris." As indicated by its associated torso icon, "Adam Ant" is a contact, for example, from the user's address book. "Anno Domini" and "Advertising Information" are web pages, as indicated by their associated globe icons. "Adenovirus" is a previous search query, as indicated by its associated magnifying glass icon. The user can select the "Adam Ant" suggestion to view information for the "Adam Ant" contact. In addition, the user can select either the "Anno Domini" web page or the "Advertising Information" web page to view the selected web page. The user can also select the "adenovirus" previous search query to perform that web search query again.

While shown here as presenting suggestions after two character inputs have been made (e.g., "a" and "d"), in some implementations, the search application 104 can update the corpora suggestions area 112 after each character input is made by the user. In addition, the search application 104 can continue to update the corpora suggestions area 112 as the user makes further inputs in the search query input area 108. In some implementations, the search application 104 updates the corpora suggestions area 112 for each character input without (and/or until) receiving an indication from the user that the search query is complete.

The search application 104 can use the search query to perform a search of one or more of the corpora. In addition, the search application 104 can use the search query to request suggestions from an external system, such as a search server or a suggestions server. For example, the search application 104 can perform a search of corpora that reside on the mobile computing device 100, such as contacts in an address book, bookmarks for a browser, web browsing history, and previous searches. In another example, a search server or suggestions server can perform a search of corpora that do not reside on the mobile computing device 100, such as web pages. In another example, the search application 104 can offload processing to a search server or a suggestions server by allowing the external server to perform searches of corpora that may already reside on the mobile computing device. In some implementations, the search application 104 periodically updates resident corpora information on an external server to reduce network traffic at the time the search is requested.

In some implementations, the search application 104 updates the corpora suggestions area 112 as suggestions become available. For example, the search application 104 may quickly search for and retrieve suggestions from locally stored corpora. Suggestions from corpora stored at an external server may be slower than suggestions from locally stored corpora. Therefore, the "Adam Ant" and "adenovirus" suggestions may be displayed quickly or immediately, while a delay occurs before inserting the "Anno Domini" and "Advertising Information" suggestions into the list of corpora suggestions.

The search application 104 also includes a web search suggestions area 114. As the user makes inputs in the search query input area 108, the search application 104 updates the web search suggestions area 114 with web searches related to the search query in the search query input area 108. As with the corpora suggestions area 112, the web search suggestions area 114 can be updated as the user inputs characters. For example, in response to the search query "ad," the search application 104 presents web search suggestions including "adriana," "adidas," and "code adam." In some implementations, where the query terms in the web search suggestions include the search query, the search application 104 replaces the search query within the web search suggestion with a shorter placeholder symbol, such as two periods. The user can select any of the web search suggestions to request that the selected web search be performed. In some implementations, the search application 104 forwards the requested web search to a search server. The search server performs the search (e.g., using an index of web pages) and returns the search results to the search application 104. In some implementations, the search server can return the search results to a browser application at the mobile computing device 100.

Figure 1C:

FIG. 1C shows an example of the user interface 102 after receiving one or more navigation inputs from the user. The user can make inputs to scroll through the list of suggestions in the corpora suggestions area 112. As shown here, the user has scrolled the corpora suggestions area 112 so that "Adam Ant" is partially out of view and an "Architecture Digest" web page suggestion is now partially in view.

In the case of a touch screen, the user can select a location within the corpora suggestions area 112 and drag the selection to a second location. In another example, the user can make an input using a device such as a dial or track ball to scroll the corpora suggestions area 112.

In addition to scrolling through suggestions in the corpora suggestions area 112, the user can make an input to scroll through the suggestions in the web search suggestions area 114. As shown here, an "Adelaide" web search suggestion is now in view and the "adriana" web search suggestion is partially out of view. Again, the user can use an input device such as a touch screen, dial, or track ball to make the input to scroll through the suggestions in the web search suggestions area 114.

Figure 1D:
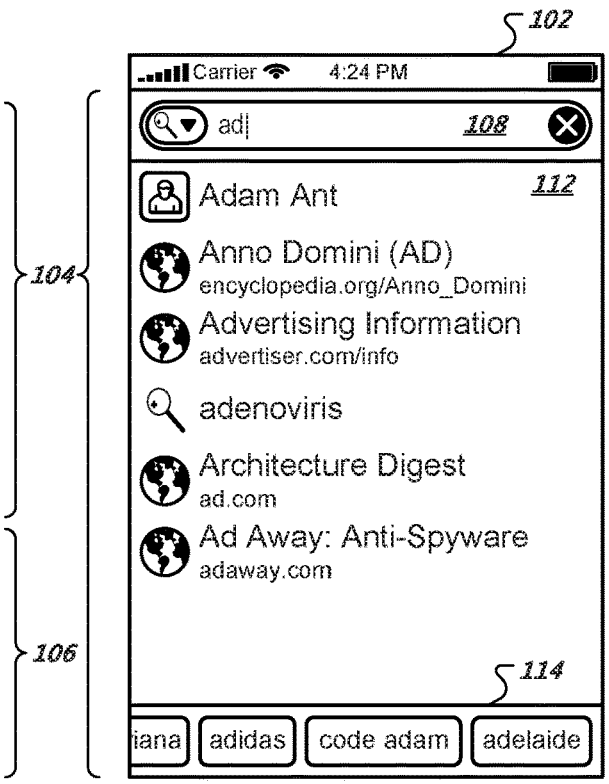

FIG. 1D shows an example of the user interface 102 after receiving an input to hide the user input area 106. For example, to indicate a request to hide the user input area 106, the user can select a touch screen location within the corpora suggestions area 112 and drag the selection to a location outside of the corpora suggestions area 112 or to a location within the user input area 106. In another example, the user can select a touch screen location within the user input area 106 and drag the selection, for example, out of the user input area 106 or to the bottom/side of the user interface 102. In some implementations, for pointing devices other than a touch screen, such as a dial or track ball, the user can indicate a request to hide the user input area 106 by scrolling to the end of the suggestions in the corpora suggestions area 112 or by scrolling past the end of the suggestions. In some implementations, the speed or length of time in which scrolling occurs can indicate a request to hide the user input area 106. For example, a fast speed or a short amount of time (e.g., faster or shorter than a typical scroll operation) can indicate a request to hide the user input area 106.

Figure 2A:
FIGS. 2A-2D show examples of a user interface for presenting suggestions from one or more corpora.

FIG. 2A shows an example of the user interface 102 after the user has made an input changing the search query to "a." The search application 104 updates the corpora suggestions area 112 to include corpora suggestions relevant to the search query "a." As shown here, the corpora suggestions now include a "John Appleseed" contact, an "Ask.gov" web page, and an "Anna Karenina" contact. The ordering of the suggestions in the list can be determined, for example, based on the relevance of the suggestions. For example, a recently accessed item can be placed higher in the list than an item accessed further in the past. In another example, a frequently accessed item can be placed higher in the list than a rarely accessed item. The user can select a corpora suggestion, such as the "Anna Karenina" contact, to view that particular item.

Figure 2B:

FIG. 2B shows an example of the user interface 102 including a contact application 200. Contact information may be displayed in this manner in response to a user selecting the element associated with the particular contact in the user interface 102. The contact application 200 presents information associated with a particular contact, such as telephone numbers, addresses, and significant dates. As shown here, the contact application 200 is currently presenting information related to the selected "Anna Karenina" contact, such as a home telephone number 202. In some implementations, the user can select the home telephone number 202 to initiate a telephone call to the contact. The user can return to the search application 104, for example, by selecting a back control 204.

Figure 2C:
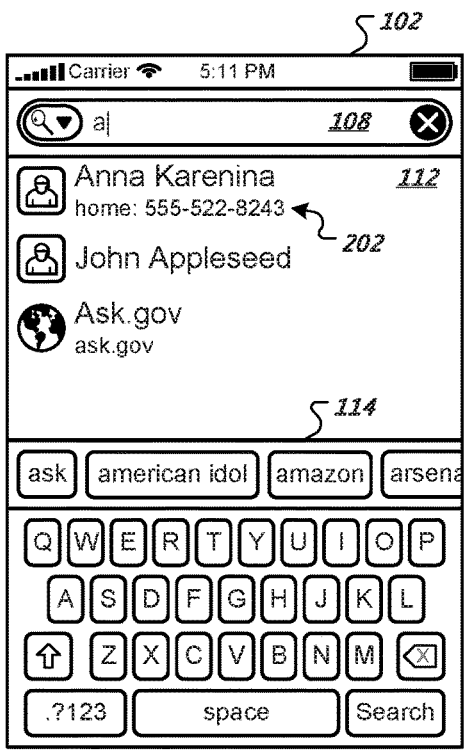

FIG. 2C shows an example of the user interface 102 after the user has placed a telephone call to the "Anna Karenina" contact. The search application 104 updates the corpora suggestions area 112 based on user interactions that occurred with the mobile computing device 100. In particular, the search application 104 has moved the "Anna Karenina" contact to the top of the list. For example, this may be due to the "Anna Karenina" contact being the most recently accessed item in the list. In another example, the reordering of the "Anna Karenina" contact may be due to it being the most frequently accessed item in the list. In addition, the reordering of the "Anna Karenina" contact may be due to a combination of factors, such as how long ago the user accessed each of the items in the list, how frequently the user accesses the items in the list, the degree of similarity between the search query and the corpora suggestions, or other factors.

The search application 104 also updates the "Anna Karenina" contact suggestion to show the home telephone number 202 that the user recently called. The search application 104 can also show other interactions recently performed by the user, such as an address to which the user sent an email.

Figure 2D:
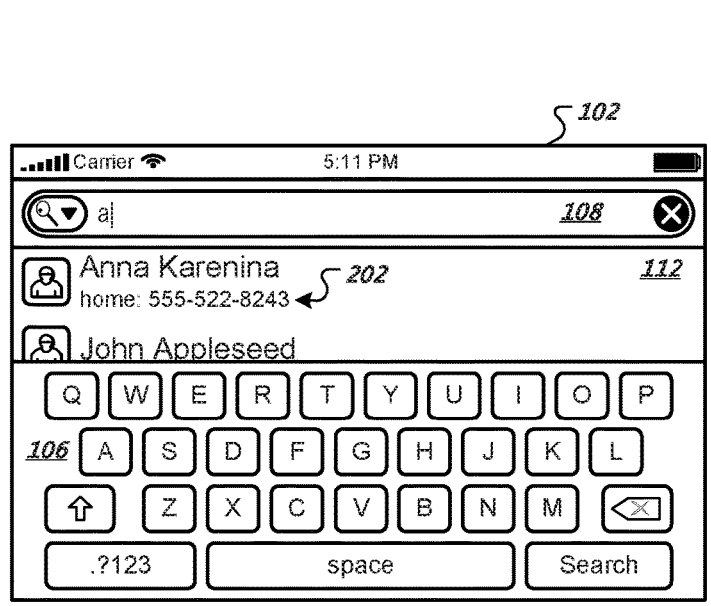

FIG. 2D shows an example of the user interface 102 rotated by ninety degrees. The user is now holding the mobile computing device 100 in a sideways orientation. The search application 104 updates the corpora suggestions area 112 to rotate the suggestions appropriately for viewing at the sideways orientation. In the example shown here, the search application 104 removes the web search suggestions area 114 to provide more vertical viewing space for the corpora suggestions area 112.

Figure 3A:
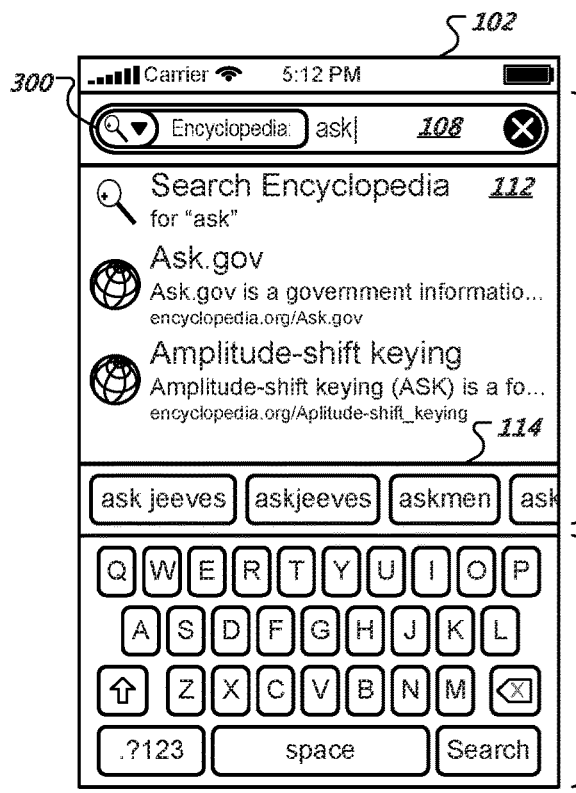
FIGS. 3A-3C show examples of a user interface for presenting suggestions from a particular corpus.

FIG. 3A shows an example of the user interface 102 including a corpus selection control 300. The user can make an input using the corpus selection control 300 to select a corpus in which to search. In some implementations, selecting the corpus selection control 300 opens an additional menu including a list of corpora, in which the user can select a predetermined corpus, such as an image search, a local search, a news search, a shopping search, or a search of an online encyclopedia. In some implementations, the user can input a domain name of a particular corpus in which to search, such as "uspto.gov." As shown here, the corpus selection control 300 indicates that the user has selected an encyclopedia corpus. The user has refined the search query in the search query input area 108 to include "ask."

A particular search corpus may also be selected by a user selecting a particular corpora, such as a particular domain or sub-domain, that appears in a list of results in the search application 104. For example, a user may long-press on the ask.com result to have the query that a user has typed or is typing, submitted to an index that is limited to the ask.com domain—i.e., to search only on that site for the entered term.

The search application 104 updates the corpora suggestions area to include only suggestions from the encyclopedia corpus that relate to the search query "ask." In particular, the suggestions include a suggestion to "Search Encyclopedia for ask." For example, the "Search Encyclopedia for ask" suggestion may perform a search of the encyclopedia using a search tool native to or provided by the encyclopedia. The corpora suggestions also include two topics from the encyclopedia, "Ask.gov" and "Amplitude-shift keying." The encyclopedia topics present additional information regarding the topics, such as a brief portion of the topic content and the web address of the topic. The user can select the encyclopedia topics to navigate to web pages that display the topics.

Figure 3B:
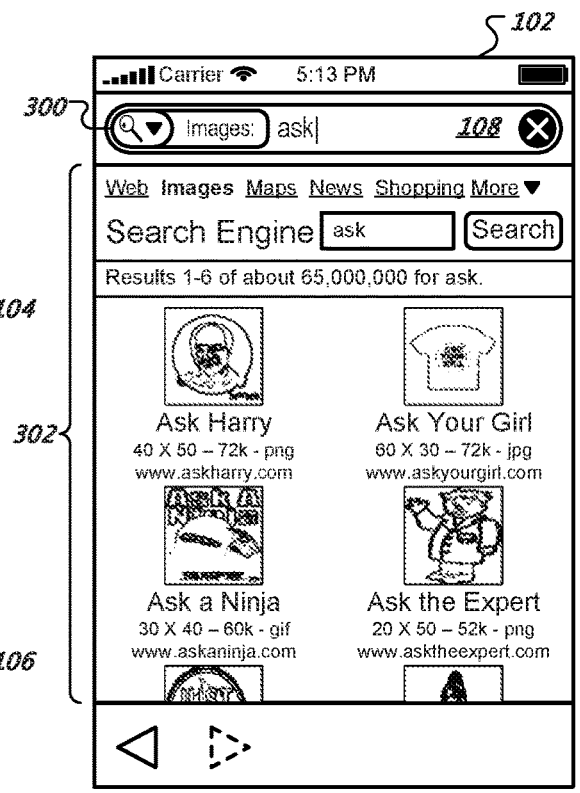

FIG. 3B shows an example of the user interface 102 after the user has selected an "Images" corpus using the corpus selection control 300. As shown here, the search application 104 includes a search results area 302. The search results area 302 includes a list of search results for images that relate to the search query "ask." The image search results present a thumbnail representation of each image, a title of each image or web page displaying the image, attributes of each image, and a web address of each image. The user can select a particular search result to navigate to the web page where the image is displayed.

In some implementations, the search application 104 presents the search results area 302. In some implementations, another application, such as a browser application presents the search results area 302. In some implementations, the search application 104 sends the search query to a vertical search server (e.g., an image search server) to perform the search of the selected corpus. In some implementations, the contents of the search results area 302 is a web page provided by the vertical search server.

Figure 3C:
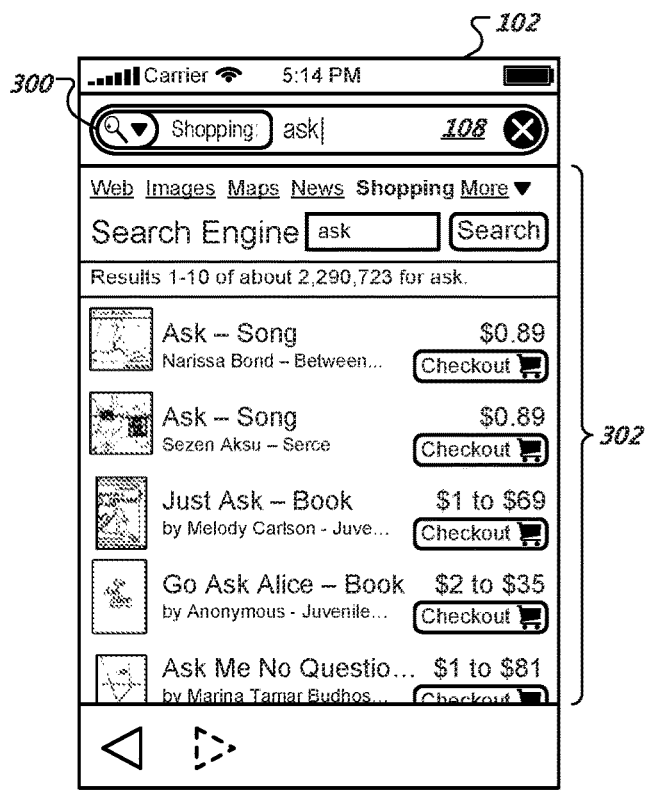

FIG. 3C shows an example of the user interface 102 that includes a shopping corpus search. The user has selected a "Shopping" corpus, as indicated in the corpus selection control 300. The search application 104 sends the "ask" search query to a shopping vertical search server. The shopping vertical search server provides a web page of shopping search results related to the "ask" search query. The search application 104 presents the shopping search results to the user in the search results area 302. Each shopping search result includes information describing an item for sale, such as a thumbnail image of the item, a title or name of the item, a short description of the item, a price or price range for the item, and a checkout control to purchase the item. The user can also select an item to navigate to a vendor web page for the item.

Figure 4A:
FIGS. 4A-4B show examples of a user interface for presenting suggestions from a local search corpus.

FIG. 4A shows an example of the user interface 102 for suggesting a local search corpus. The user has made an input in the search query input area 108 that includes the search query "library." The corpora suggestions area 112 includes suggestions for a "Library of Congress" web page and a "Library" web page at an online encyclopedia. The search query "library" is identified as belonging to a category of local search. As a result, the corpora suggestions area 112 includes a "Search for 'library' near me" suggestion.

The term "library" may be included in a whitelist of categories typically used for local search. Here, local search refers to a search for something that is geographically near the mobile computing device 100 and/or the user. For example, local search categories can include terms such as "restaurant," "theater," "library," and other destinations users typically search for near their geographic location. In addition, a local search category can include sub-categories. For example, the "restaurant" category can include a sub-category of "Thai." In this example, where a user inputs a search query of "restau," not only can the "restaurant" local search suggestion be presented, but a "thai restaurant" local search suggestion can be presented as well. If the user has made a previous interaction including "Thai," such as a selection in an address book entry for a restaurant named "Thai-2-Go" or a previous search query for "Thai Cultural Center," then the search application 104 moves the "thai restaurant" local search suggestion to a position above the "restaurant" local search suggestion in the corpora suggestions area 112.

In some implementations, the whitelist is stored at a suggestion server. For example, the suggestion server can receive the "library" search query from the search application 104. The suggestion server compares the search query to categories in the whitelist to determine if the search query includes a local search category. The suggestion server provides the determined local search suggestions to the search application 104 and the search application 104 presents the local search suggestions in the corpora suggestions area 112.

In another example, the whitelist is stored at the mobile computing device 100. The mobile computing device 100 compares the search query to the categories in the whitelist to determine if a term in the search query represents a local search category. In some implementations, a suggestion server maintains the whitelist and periodically updates a copy of the whitelist at the mobile computing device 100.

The user can select the "Search for 'library' near me" suggestion to initiate the local search for the search query "library." The search application 104 sends the search query "library" to a local vertical search server. The search application 104 also sends a geographic location associated with the local search request, such as a latitude of 44.9765 degrees and a longitude of −93.2712 degrees, a postal code of "55402," or a city of Minneapolis.

For example, the search application 104 may determine a geographic location using a Global Positioning System (GPS) device within or accessible to the mobile computing device 100. The search application 104 can send latitude and longitude values of the mobile computing device 100 to the local search server. In another example, the search application 104 can determine a geographic location using another method, such as cellular/wireless tower lookup or a geo-IP (Internet Protocol) lookup using a database of IP addresses or WHOIS information. In another example, the user can input a particular geographic location, such as by inputting a mailing address, city, state, or postal code.

Figure 4B:
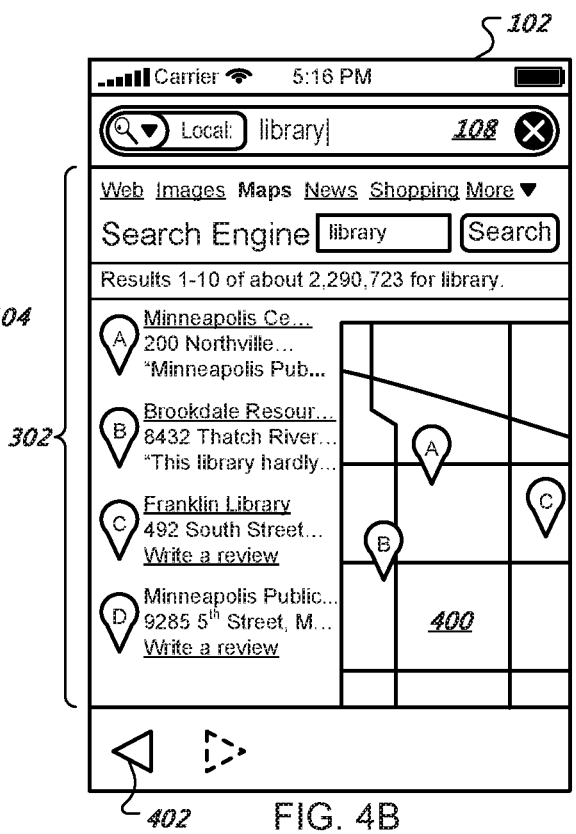

FIG. 4B shows an example of the user interface 102 that includes local search results for the search query "library" and the geographic location "44.9765, −93.2712." The search application 104 receives the local search results from the local search server. The search application 104 presents the local search results in the search results area 302. The local search results include a list of web pages related to "library" and near "44.9765, −93.2712." In particular, the list includes a "Minneapolis Central Library" web page (A), a "Brookdale Resource Library" web page (B), a "Franklin Library" web page (C), and a "Minneapolis Public Library Administration" web page (D). The search results area 302 for the local search results also includes a map 400. The map 400 shows the geographic locations of A, B, C, and D. The user can select the web page search results for A, B, C, and D to navigate to the selected web page. The user can select a back button 402 to navigate back to the search suggestions for the "library" search query, as shown in FIG. 4A. The user can then select, for example, a "library of congress" search button 404 in the web search suggestions area 114.

FIG. 5A shows an example of the user interface 102 that includes web search results for a "library of congress" search query. The search results area 302 includes search results for a "Library of Congress—Home" web page, a "Library of Congress—Catalog" web page, and a "THOMAS (Library of Congress)" web page. Each search result includes a title, a brief description or portion of the web page, and the network address of the web page. The user can select a search result to navigate to the web page represented by the search result. For example, the user can select the "Library of Congress—Home" search result to navigate to the "Library of Congress—Home" web page. The web page is opened using an instance of a browser application.

FIG. 5B shows an example of the user interface 102 that includes a browser application 500. The browser application 500 retrieves the "Library of Congress—Home" web page and presents the "Library of Congress—Home" web page to the user. In particular, the browser application 500 includes an address bar 502. The address bar 502 shows the network address of the web page being presented. The browser application 500 also includes a web page presentation area 504. The web page presentation area 504 includes the contents of the "Library of Congress—Home" web page.

In addition, the browser application 500 includes navigation controls, such as a back arrow button 506. The user can select the back button to navigate back to the search results. However, the search results are presented within the web page presentation area 504 of the browser application 500 rather than within the search results area 302 of the search application 104.

FIG. 5C shows an example of the user interface 102 that includes the search results for the "library of congress" search query in the browser application 500. In particular, when navigating from a web page back to search results, the browser application 500 presents the search results within the web page presentation area 504. In some implementations, this has the benefit of allowing the user to navigate back and forth through web pages and the search results without leaving the application being used for presentation (e.g., the browser). In some implementations, this can provide a consistent user experience as the user navigates the web pages. In some implementations, this can provide faster page rendering over switching back and forth between applications when navigating through search results and web pages.

Figure 6A:
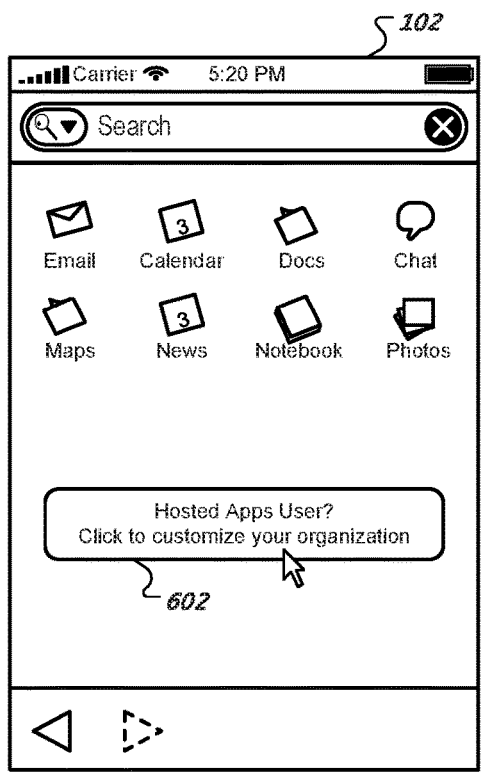
FIGS. 6A-6C show examples of a user interface for selecting a domain for additional applications.

FIG. 6A shows an example of the user interface 102 and an additional applications page 600. For example, the user can select the "Explore More Products" button 110, as shown in FIG. 1A, to navigate to the additional applications page 600. The additional applications page 600 includes navigation links to applications other than search, such as an email application, a calendar application, a documents application, a chat application, a maps application, a news application, a notebook application, and a photos application. The user can select a link to an additional application to initiate the selected application. The additional applications page 600 also includes a customize control 602. The user can select the customize control 602 to navigate to a page for customizing additional applications for a hosted application. In particular, the user can input a domain name (e.g., myorganization.net) to be used for additional applications, such as email, calendar, documents, and chat. The customized additional applications can be hosted by, for example, the search server. A device, such as the mobile computing device 100 can then access the customized additional applications using the customized domain name rather than a domain name of the application provider.

Figure 6B:
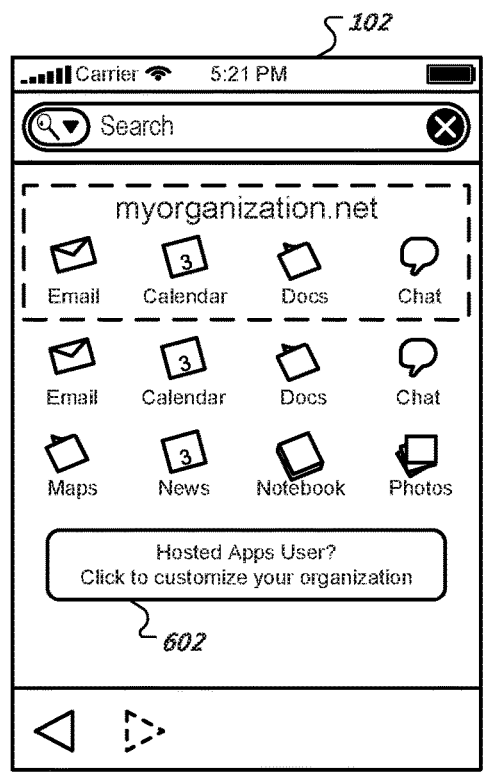

FIG. 6B shows an example of the user interface 102 and the additional applications page 600 that shows hosted applications. The hosted applications are included in a hosted applications area 604. The hosted applications area 604 also shows the custom domain name (e.g., myorganization.net).

Figure 6C:
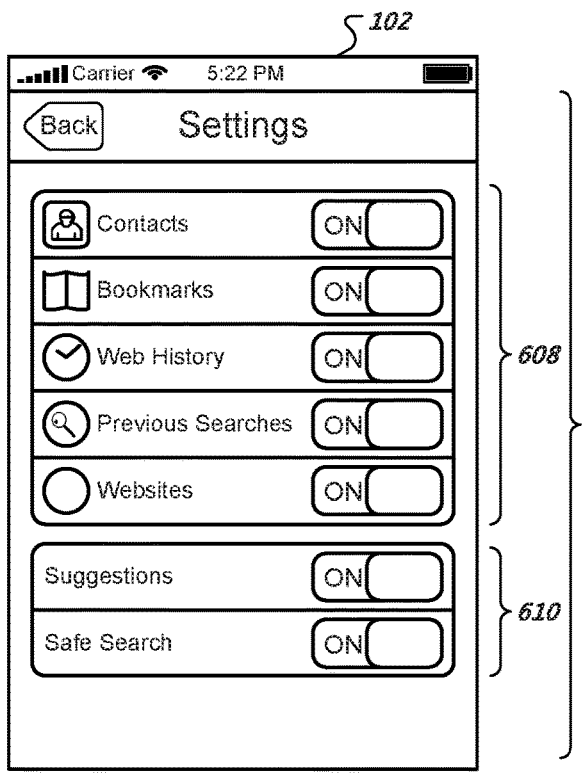

FIG. 6C shows an example of the user interface 102 and a settings page 606. The settings page 606 includes multiple corpora selection controls 608 that allow a user to select the types of corpora for inclusion in search suggestions. The corpora selection controls 608 can include types such as contacts, bookmarks, web history, previous searches, and websites. For example, the user can select the "Bookmarks" corpora selection control to toggle bookmark searching off. These corpora types determine the suggestions to be included in the corpora suggestions area 112. The settings page 606 also includes a suggestion control 610. The suggestion control 610 allows the user to enable or disable the web search suggestions area 114. For example, the user can select the suggestion control 610 to toggle the web search suggestions area 114 off.

FIGS. 7A-7D, 8A-8B, 9A-9B, and 11 are flow charts showing examples of processes, for interactive search querying. The processes may be performed, for example, by a device such as the mobile computing device 100 and the user interface 102. For clarity of presentation, the description that follows uses the mobile computing device 100 and the user interface 102 as the basis for examples describing the processes. However, another device, system, or combination of systems, may be used to perform the processes.

Figure 7A:
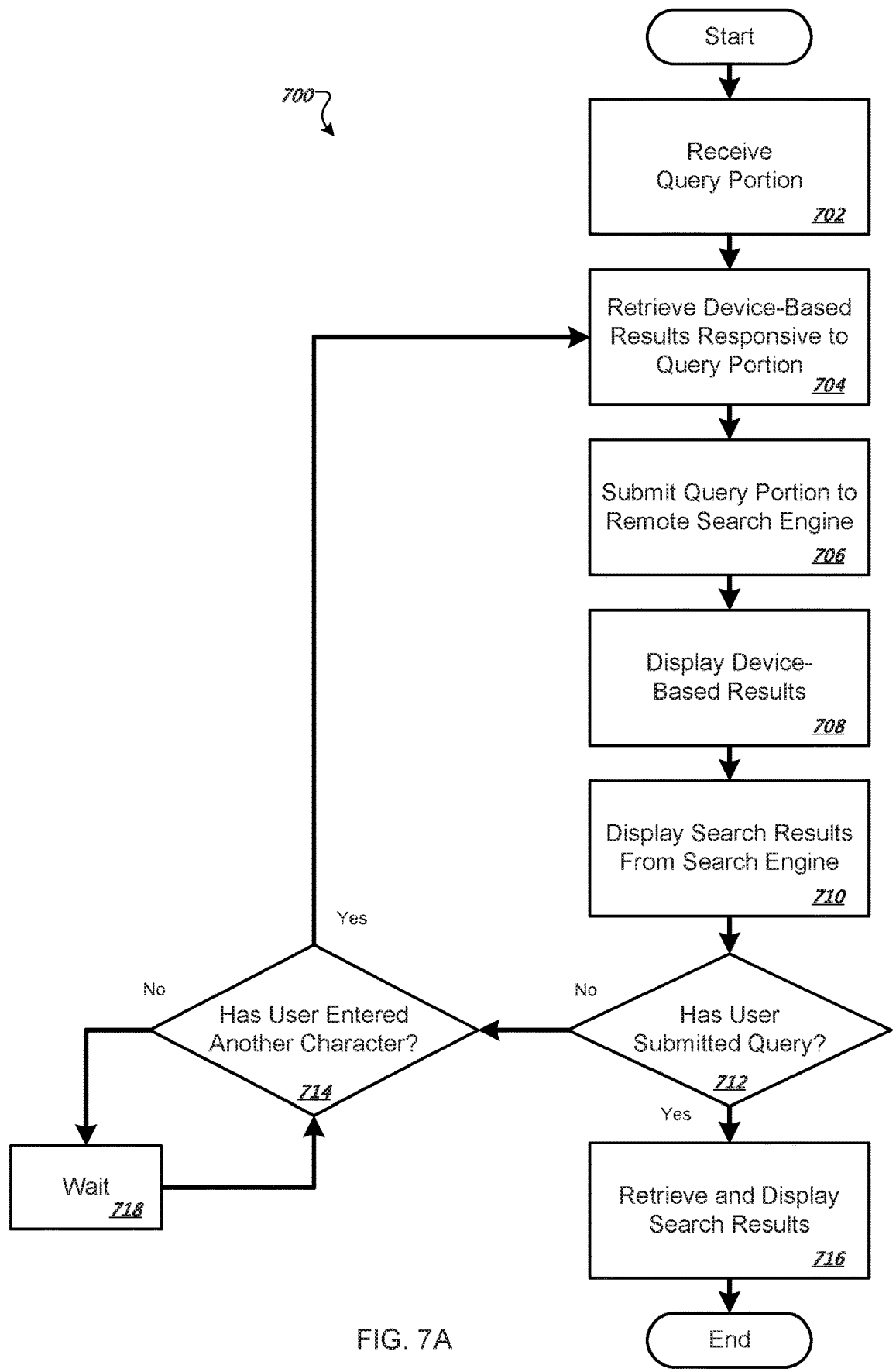
FIGS. 7A-7D are flow charts showing examples of processes for displaying search suggestions and search results.

FIG. 7A shows an example of a process 700 for displaying search suggestions and search results. The process 700 begins with receiving (702) a portion of a search query. For example, the user can input the search query portion "ad" in the search query input area 108.

The process 700 retrieves (704) device-based results responsive to the received search query portion. For example, the search application 104 can retrieve locally stored information, such as the "Adam Ant" contact or the previously performed "adenovirus" web search.

The process 700 submits (706) the search query portion to a remote search engine. For example, the search application 104 submits the "ad" search query portion to a remote suggestion server.

The process 700 displays (708) the device-based suggestion results. For example, the search application 104 presents the "Adam Ant" contact suggestion and the "adenovirus" previous web search suggestion.

The process 700 receives and displays (710) suggestion results from the search engine. For example, the search application 104 receives and subsequently displays the "Anno Domini" and "Advertising Information" web page suggestions from the suggestion server.

If the user has not finished submitting the search query (712) and if the user has entered another character in the search query portion (714), then the process 700 retrieves (709) the device-based results again. For example, the user may delete a character from the search query "ad" resulting in "a." The search application 104 can recognize the search query "a" as having been previously retrieved. The search application 104 can retrieve a cached copy of the previously retrieved suggestions. This can result in skipping the submitting (706) to and displaying (710) from the remote search engine.

If the user has finished submitting the search query (712), then the process 700 retrieves (716) and displays search results for the search query. For example, the user can select a button in the web search suggestions area 114, the search button in the user input area 106, or a search suggestion in the corpora suggestions area 112. If the user has not finished submitting the search query (712) and if the user has not entered another character in the search query portion (714), then the process 700 waits (718) for another character to be entered.

Figure 7B:
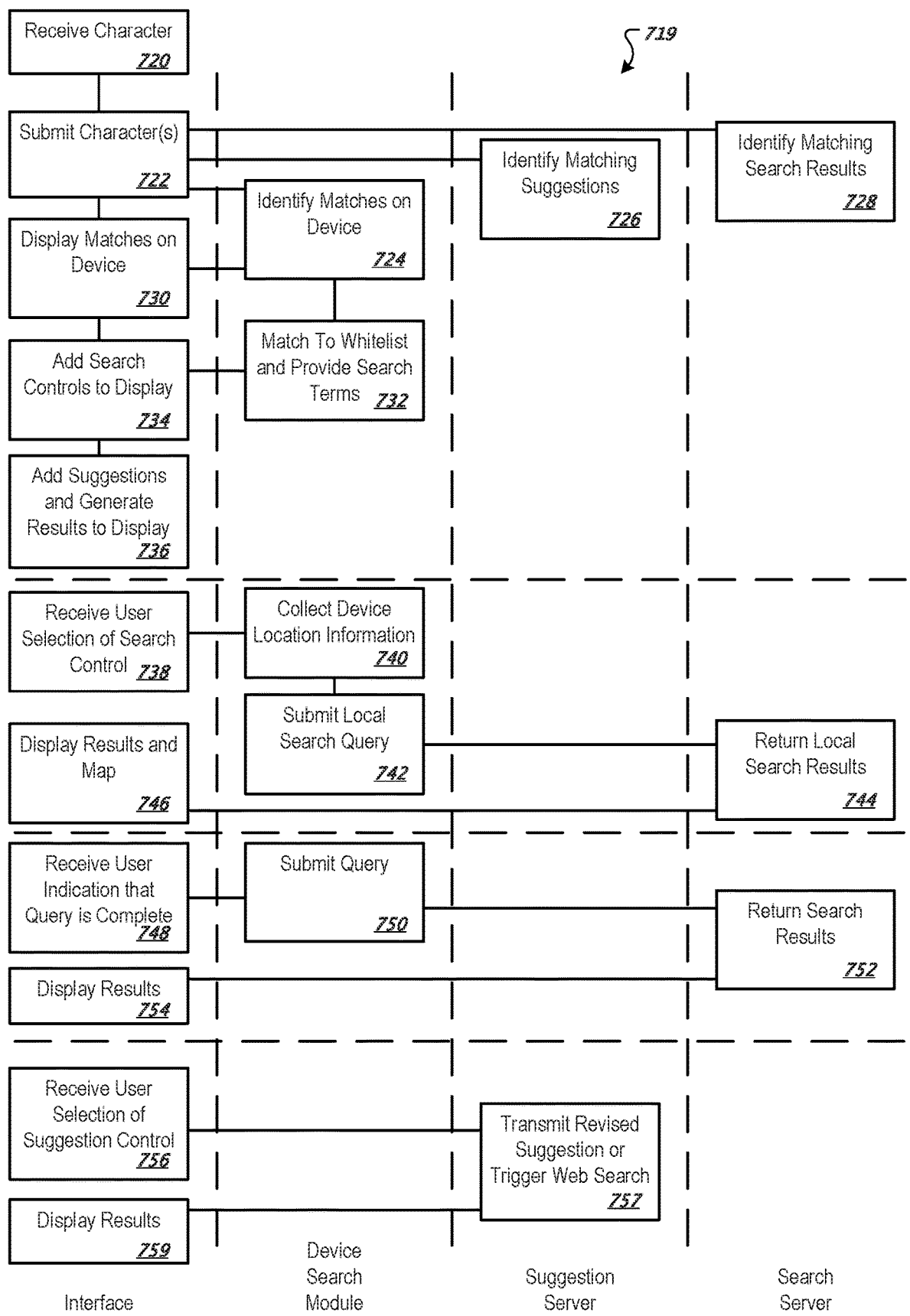

FIG. 7B shows an example of a process 719 for displaying search suggestions and search results. The process 719 begins with an interface receiving (720) one or more characters of a search query. For example, the user can make an input in the search query input area 108 of the user interface 102.

The interface submits (722) the search query characters to a device search module, a suggestion server, and a search server. For example, the search application 104 and one or more external servers can process the search query to determine suggestions.

The device search module identifies (724) matches between the search query and data on the device. For example, the search application 104 can match the "ad" search query to the "Adam Ant" and "adenovirus" suggestions.

The suggestion server identifies (726) matches between the search query and data at the suggestion server. For example, a suggestion server can determine the suggestions in the web search suggestions area 114.

The search server identifies (728) matches between the search query and data at the search server. For example, a search server can determine the "Anno Domini" and "Advertising Information" suggestions.

The interface displays (730) matches from the device search module, the suggestion server, and the search server on the device. For example, the search application 104 receives the suggestions and presents the suggestions within the corpora suggestions area 112 and the web search suggestions area 114.

The device search module matches (732) the search query characters to a whitelist of search terms and provides the search terms to the interface. For example, the search application 104 can match the "library" search query to a "library" category in a whitelist of local search categories.

The interface adds (734) search controls to the display. For example, the search application 104 adds the "Search for 'library' near me" search suggestion to the corpora suggestions area 112.

The interface adds (736) suggestions and general results to the display. For example, the search application 104 can add web page suggestion results to the corpora suggestions area 112.

The interface receives (738) a user selection of a local search control and forwards the search control selection to the device search module. For example, the user can select the "Search for 'library' near me" search suggestion.

The device search module collects (740) device location information. The device search module submits (742) a local search query to the search server. For example, the search application 104 can access GPS information provided by the mobile computing device 100 and submits the GPS information along with the search query to the search server.

The search server performs the local search query and returns (744) local search results to the interface. The interface displays (746) the local search results and a map. For example, the search application 104 receives and displays a list of local libraries and a map showing the locations of the libraries.

The interface receives (748) an indication that the search query is complete and notifies the device search module. For example, the user can select a web search suggestion in the web search suggestions area 114, the search button in the user input area 106, or another search suggestion in the corpora suggestions area 112.

The device search module submits (750) the search query to the search server. The search server returns (752) the search results to the interface. The interface displays (754) the search results. For example, the search application submits the search query to the search server, the search server returns the web search results, the search application 104 displays the web search results in the search results area 302.

The interface receives (756) a user selection of a search control and forwards the user selection to the suggestion server. The suggestion server transmits (757) a revised suggestion to the interface or triggers a web search. The interface displays (759) the revised suggestion or web search results. For example, the user can select a web search suggestion in the web search suggestions area 114. The suggestion server can revise the suggestions or send a list of search results matching the selected web search suggestion. The search application 104 displays the search results from the suggestion server.

Figure 7C:
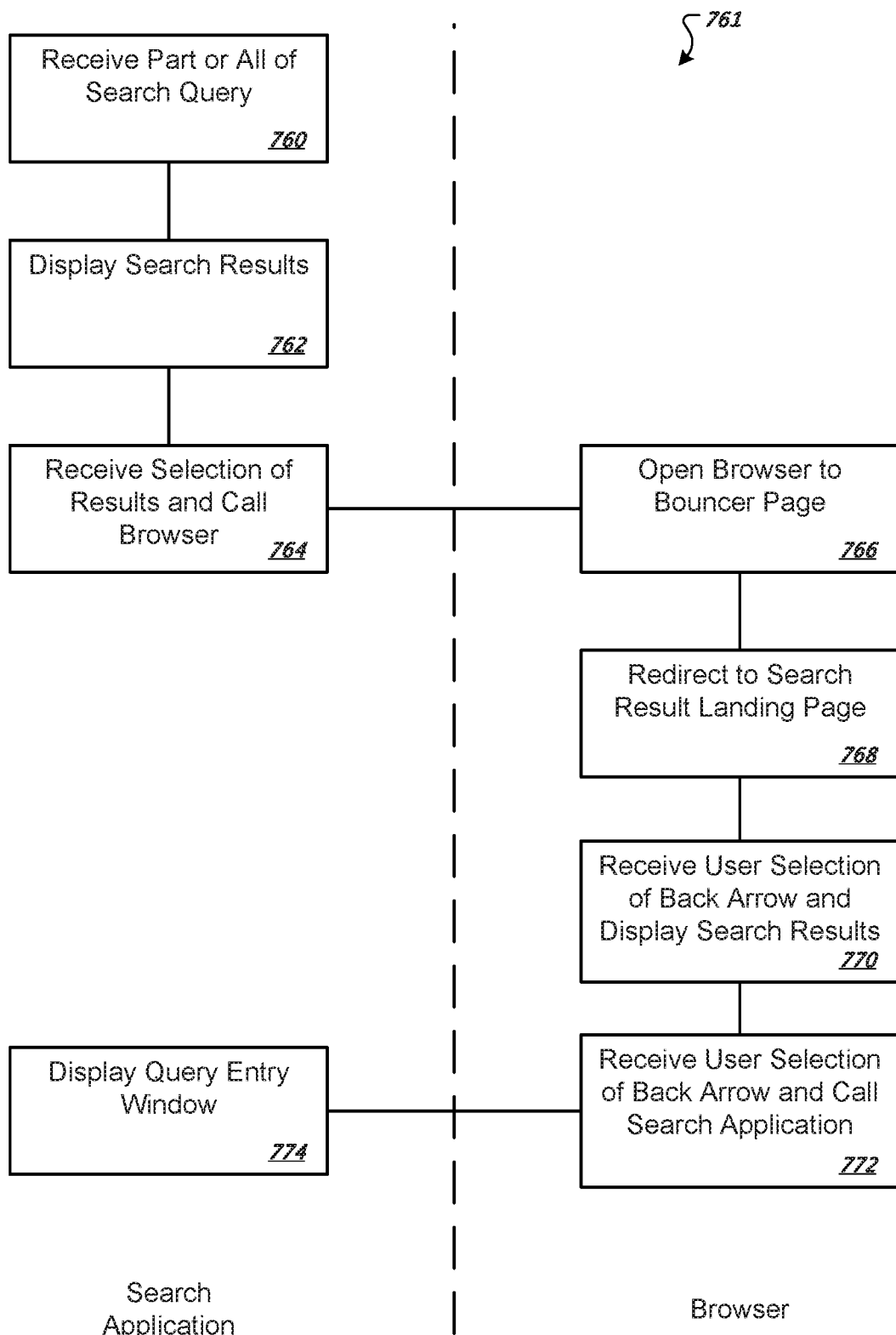

FIG. 7C shows an example of a process 761 for displaying search suggestions and search results. The process 761 begins with a search application receiving (760) part or all of a search query. The search application displays (762) search results from performing the search query. The search application receives (764) a selection of a search result and calls a browser. For example, the search application can receive the "library of congress" search query. The search application 104 displays the search results for the "library of congress" search query in the search results area 302. The search application 104 receives a user selection of a link to "www.loc.gov."

The browser opens (766) a bouncer page. For example, the search application 104 can issue a command for an operating system of the mobile computing device 100 to open a bouncer page using the browser application 500.

The browser redirects (768) to a search result landing page. For example, the bouncer page requested by the search application 104 includes a command that redirects the browser application 500 to the destination web page (e.g., "www.loc.gov"). The bouncer page is now in the web page history of the browser application 500.

The browser receives (770) a user selection of a back arrow and in response, displays the search results. For example, the browser application 500 loads the search results as shown in FIG. 5C.

The browser receives (772) another user selection of the back arrow and calls the search application. The search application displays (774) the query entry window. For example, the browser application 500 loads the bouncer page from the history. Code in the bouncer page executes to close the browser application 500 and open the search application 104. In some implementations, the search application 104 loads stored state information to open in the state in which the user left the search application 104 prior to opening the browser application 500.

Figure 7D:
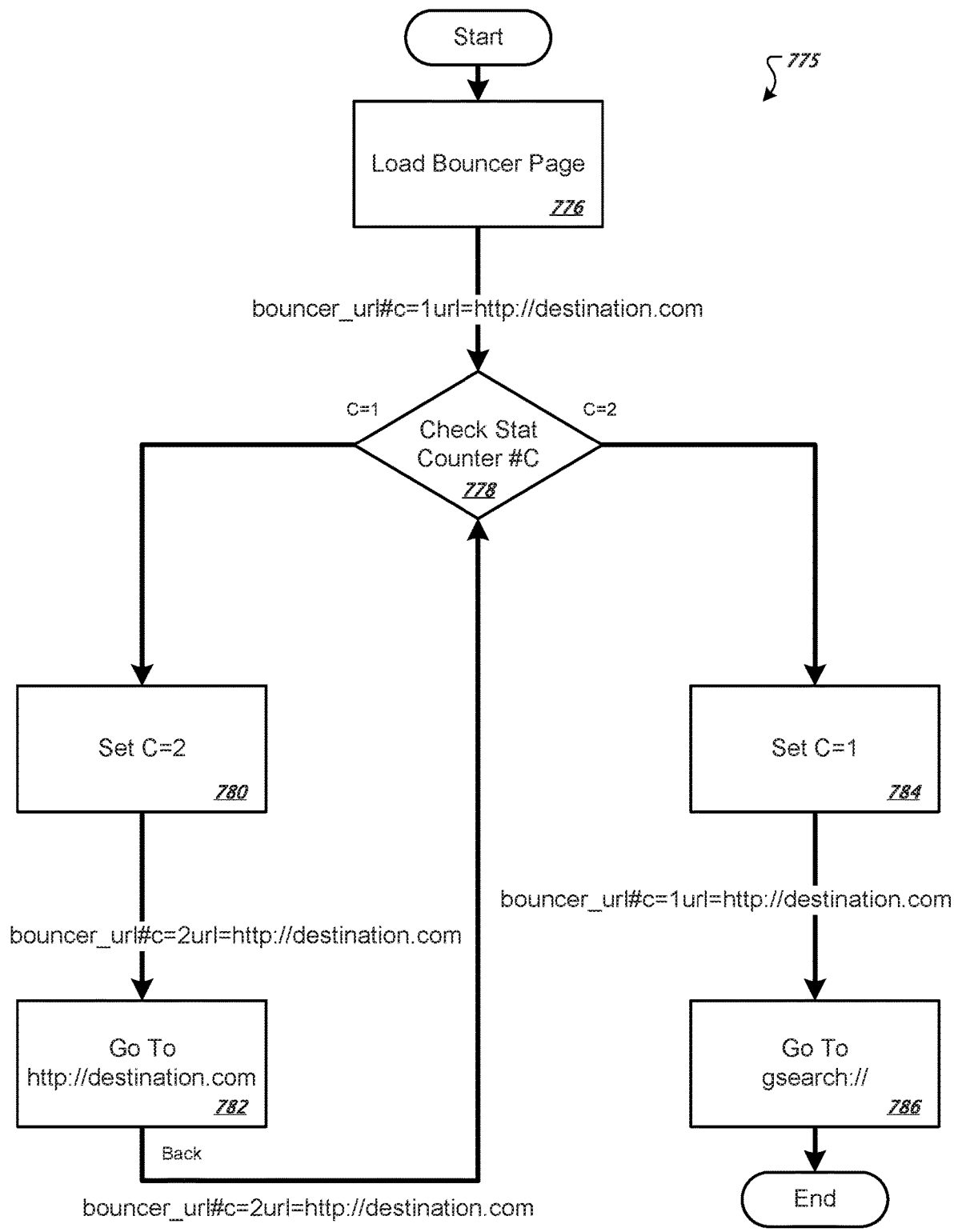

FIG. 7D shows an example of a process 775 for switching between a search application and a browser application. The process 775 begins with loading (776) a bouncer page in a browser application. The URL "bouncer_url" could be a page local to the mobile computing device 100 or a page on an external server. The search application 104 requests that the browser application 500 open the "bouncer_url" page. The full "bouncer_url" address includes parameters passed to code in the "bouncer_url" page (e.g., statistic counter—c, and web page destination—url). The initial value of the c parameter is one. The initial value of the url parameter is the destination web page.

If the statistic counter is one (778), then the process 775 sets the statistic counter to two. The process 775 directs (782) the browser to the Uniform Resource Locator (URL) parameter originally passed to the bouncer page.

If the user selects the back button in the browser, then the statistic counter is checked again (778). The statistic counter is now two, therefore the process 775 sets (784) the statistic counter back to one and directs (786) the browser application to the Uniform Resource Identifier (URI) scheme "gsearch://." The "gsearch://" URI scheme is registered with the operating system of the mobile computing device 100 to be processed with the search application 104. In some implementations, the URL after the URI scheme is ignored by the search application 104. In some implementations, the browser application 500 can pass state change information to the search application 104 within a URL after the "gsearch://" URI scheme. For example, if the user changes the search query in the web page presentation area 504, then the change can be made to the search query input area 108 when the search application 104 is displayed again.

Figure 8A:
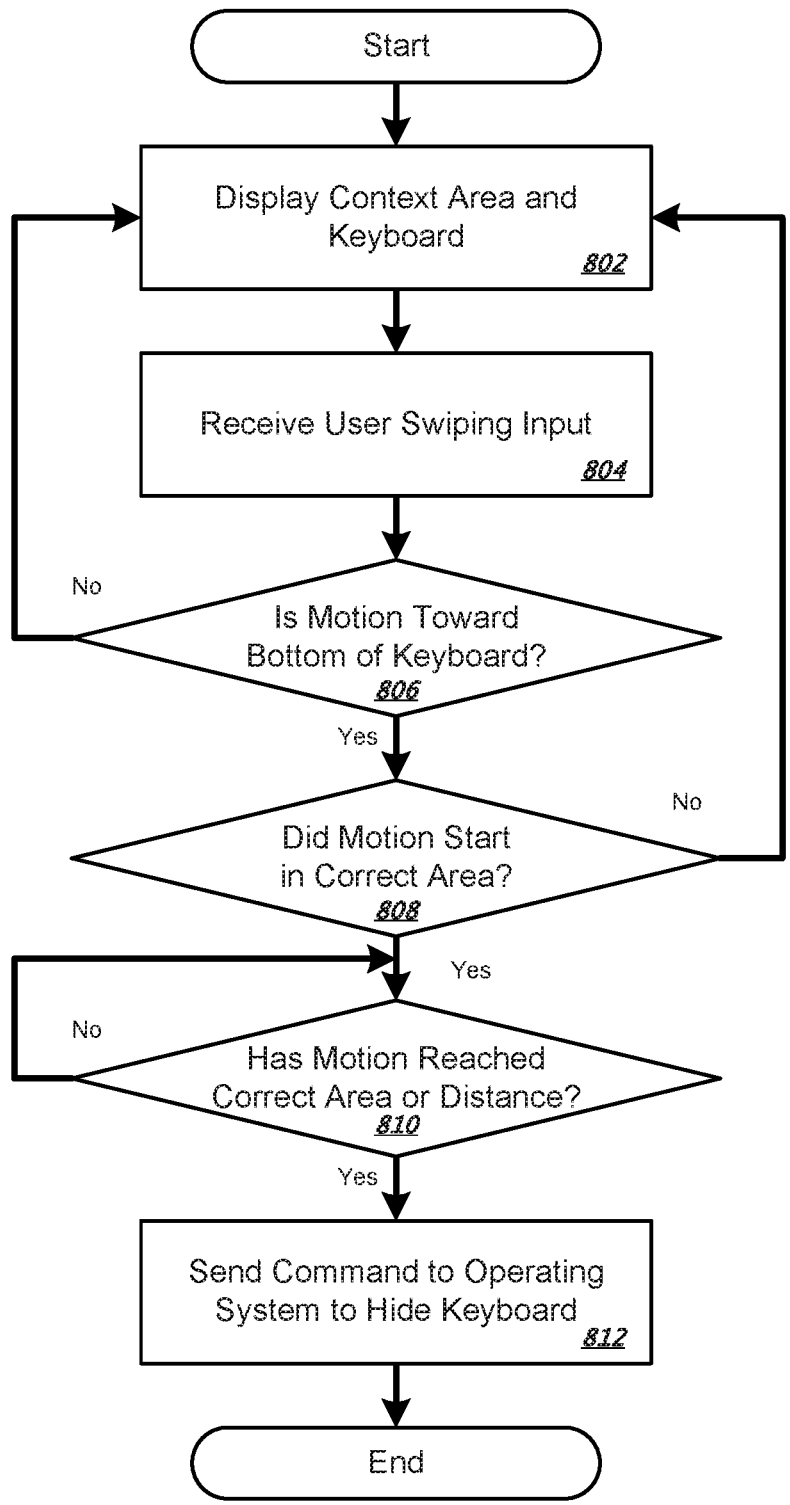
FIGS. 8A-8B are flow charts showing examples of processes for hiding a keyboard.

FIG. 8A is a flowchart showing a process for interacting with a user of a touchscreen computing device such as a mobile smart phone. In general, the process involves displaying a keyboard and a content area on a touchscreen of the computing device, receiving user interaction in the content area, and hiding the keyboard in response to the user action so that more space on the display may be devoted to the content area. The user action may involve, for example, a user pressing their finger to the touchscreen in the content area and sliding the finger toward the keyboard so as to indicate an intent to wipe the keyboard off the display. The user may also put their finger on an area of the keyboard and pull downward on it toward an edge of the display so as to communicate a similar intent to the device.

Referring now specifically to the process, at box 802, a computing device displays a content area and a keyboard on a touchscreen display. Such a display may be similar to that shown in the figures above, such as in FIG. 1A, where a search entry box is shown with a keyboard on a touchscreen.

The user may perform various actions with the device, such as by entering characters into a search box using the keyboard, so as to submit a query to a search engine. Such interaction by the user may result in additional information being displayed in a content area, such as by having search results that are responsive to a query being displayed in the content area. A keyboard may take up a substantial portion of the display, so that not all of the search results can be displayed at one time in the content area. As a result, as shown by box 804, the device may receive a user swiping input. The swiping input, or dragging input, may involve the receipt of a user contact on a touchscreen followed by motion while the contact is maintained. For example, a user may press their index finger against the touchscreen and may drag the finger across the touchscreen so as to provide a swiping input.

Because a device may be able to accept a variety of user inputs on a touchscreen at any one time—where the intent of the input can depend on the location of the inputs, the type of input (e.g., tapping or dragging or double tapping), and the length or direction of motion that accompanies an input—the process shown here may then test a user input to determine the likely intent of the user. For example, at box 806, the process tests whether the motion by the user is directed toward a bottom edge of the keyboard. For example, when the keyboard is arranged across the bottom of the display (e.g., FIG. 1A), the device may determine whether the user's motion is toward the bottom edge of the display. Such a determination may be made, for example, by obtaining, from an operating system that controls the user interface, figures that indicate the coordinates of an initial user touch on the screen, and later coordinates as the user moves their finger on the screen. If such figures indicate that the finger is moving downward on the Y-axis, a program may determine that the user is dragging their finger downward toward the bottom of the keyboard. Such a determination may also be made by a component of the operating system that may then report descriptive data, rather than coordinate data, relating to a selection by a user. For example, the component of the operating system may report an area in which a touching event occurred, a speed of motion for the event, and the direction of the motion.

If the motion is not toward the bottom of the keyboard, as determined at box 806, then the input is determined to be for a reason other than to affect the display of the keyboard, and a different module or component may provide feedback to the user based on the input. For example, the user input may have been a tapping input to indicate a selection of a visual control on the display.

If the motion is toward a bottom of the keyboard (or other appropriate measure by which a user can indicate an intent to hide a keyboard in an intuitive manner), then the process tests, at box 808, whether the motion started in an appropriate area of the display. For example, in some implementations, hiding of a keyboard may be instituted by a user pressing in the content area and swiping downward to another particular area, or across a particular distance. As a result, box 808 may determine whether the user started the swiping motion in the content area. If the user did not start the motion in the content area than the user may be intending to indicate a different command than a command to remove the keyboard.

If the motion did start in the appropriate area, the process may then test, at box 810, whether the motion has reached a correct area or distance. For example, a system may be programmed so that downward sliding motions over a short distance in a content area has one meaning, whereas downward sliding motions across a longer distance have a different meaning, such as to cause the hiding of a keyboard. For example, a keyboard may be hidden only when the user slides across the content area and their finger subsequently reaches the edge of the content area or the edge of the keyboard. Alternatively, the keyboard may be hidden after the user has slid their finger a sufficient distance across the content area or across the display, regardless of whether the finger has reached the keyboard or not. In another implementation, the keyboard may disappear after the user's finger has traveled a sufficient distance downward through the keyboard, so that the user must provide an exaggerated input starting in the content area and moving into and across at least an upper part of the keyboard, before the keyboard will be hidden.

During a user's downward motion, or the initial start of such downward motion, the process may change the visual look of the keyboard, so as to provide feedback to the user that indicates that the action the user is performing is an action that may result in the hiding of the keyboard. For example, when a user initially starts to slide their finger downward in a content area, the keyboard may be shifted downward slightly on the display, or may be made to shrink slightly on the display, so as to indicate to the user that further sliding of their finger in the same direction may result in the keyboard going away entirely, and not simply just shifting or shrinking. Other changes in the visual appearance of the keyboard, or other feedback such as sounds created by the device, may also be provided to the user after they have started a motion indicating an intent or possible intent to hide a keyboard, but before the motion has progressed sufficiently that the device will actually hide the keyboard.

At box 812, the process sends a command to the operating system to hide the keyboard. For example, a search application that is a native application on a device may have access to a keyboard only indirectly through components of an operating system. The operating system may make the keyboard available to various applications, but for security and other reasons, may maintain control over how the keyboard is directly handled. As a result, a program such as a search application may use a command that may be obtained through a standard application programming interface (API), to pass a message to a component of the operating system that is responsible for the keyboard, so as to cause the display of the keyboard to change, or to cause the keyboard to be hidden.

Figure 8B:
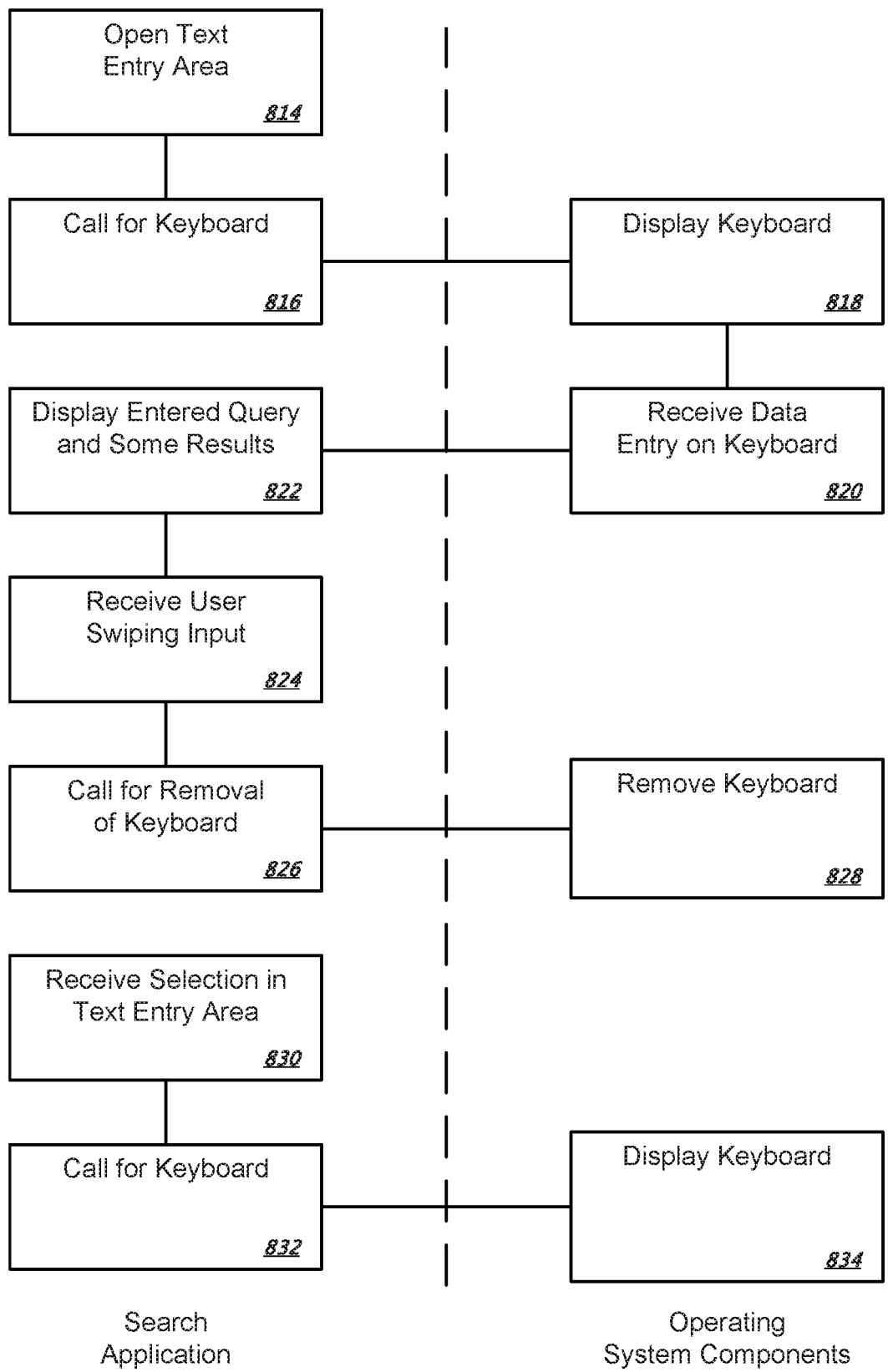

FIG. 8B shows a swim lane diagram of actions that may occur between a search application and operating system components during the display and removal of a keyboard a display of a computing device. In general, the process shows various actions performed by a search application that interacts with a user of a computing device, and commands or messages passed by the search application to components of the operating system so as to affect the manner in which a keyboard on the device is displayed by the components of the operating system. Various other distributions of actions may be provided in appropriate situations, and the particular actions performed by each part of the system shown here are provided for simplification of discussion only.

Starting a box 814, a search application opens a text entry area. For example, when the search application is initially launched, it may display to a user a data entry box where the user can type text for search queries that the user would like to submit to a remote search engine system. Upon recognizing that the search box requires entry of text, the search application may desire to provide the user with a keyboard to make the entry of text easier, and may thus communicate with the operating system components in a standard manner to call for a keyboard to be displayed, as at box 816. The operating system components may then cause the display of the keyboard, at box 818, such as by displaying the keyboard adjacent to the text entry area and a separate area for displaying search results to the user (which together make up the content area, with or without other areas displaying or receiving content form the user).

The process may then wait for further input from the user, such as data entry on the keyboard by the user pressing buttons on the display of the keyboard, at box 820. The operating system components may recognize that the data was entered with respect to the search application, and may thus pass the data to the search application, which may then display the entered data as a query for the device. The entered data also can include an indication to submit a query, and in response, the search application may also display results for that query, as shown at box 822.

A user of the device may then determine that they are done entering text for a period of time, and they thus no longer need to use the keyboard in the near future. The user may also determine that they have received a number of search results and that they are unable to view all the search results with the keyboard occupying a substantial portion of the display. The user may thus provide a touchscreen input in a manner that indicates the user's intent to have the keyboard removed or hidden. In this example, at box 824, the user provides a swiping or dragging input that is received by the device.

The search application or another application may receive notification of the swiping input from the operating system components, and it may interpret the input in an appropriate manner, according to parameters established for the application. For example, the swiping motion may only be valid for purposes of affecting the keyboard if the motion is made in a particular direction such as toward a perimeter of a display in the direction of the keyboard, in a manner to show an intent to swipe the keyboard off the display.

Various parameters may be established for determining whether such input is valid as an attempt to remove the keyboard, or is instead an intent to provide a different command to the device. If such an intent is indicated by the user input, the search application or another appropriate structure may call for removal of the keyboard (box 826). For example, the search application may transmit to the operating system components an command that causes the operating system to remove the keyboard from the screen (box 828). A search application may then expand outward, as appropriate, to fill whatever space on the display was vacated by the keyboard.

At some later point in time, such as after the user has reviewed all of the search results and perhaps visited landing pages associated with some of the search results, the user may choose to enter a new query or to edit the query they previously entered. In such a situation, the user may tap in the area of a text entry box so as to move an active area on a display (e.g., a cursor) to the text entry box (box 830). Upon such an indication by the user, or another user input reflecting an intent to enter additional textual data, the search application may call the operating system so as to have the keyboard displayed again (box 832). The operating system components may then respond in a normal manner by activating the keyboard and causing it to be displayed on the display (box 834). Such actions as described above may then be repeated in various manners so as to match the operation of a device to inputs and expectations of a user.

Figure 9A:
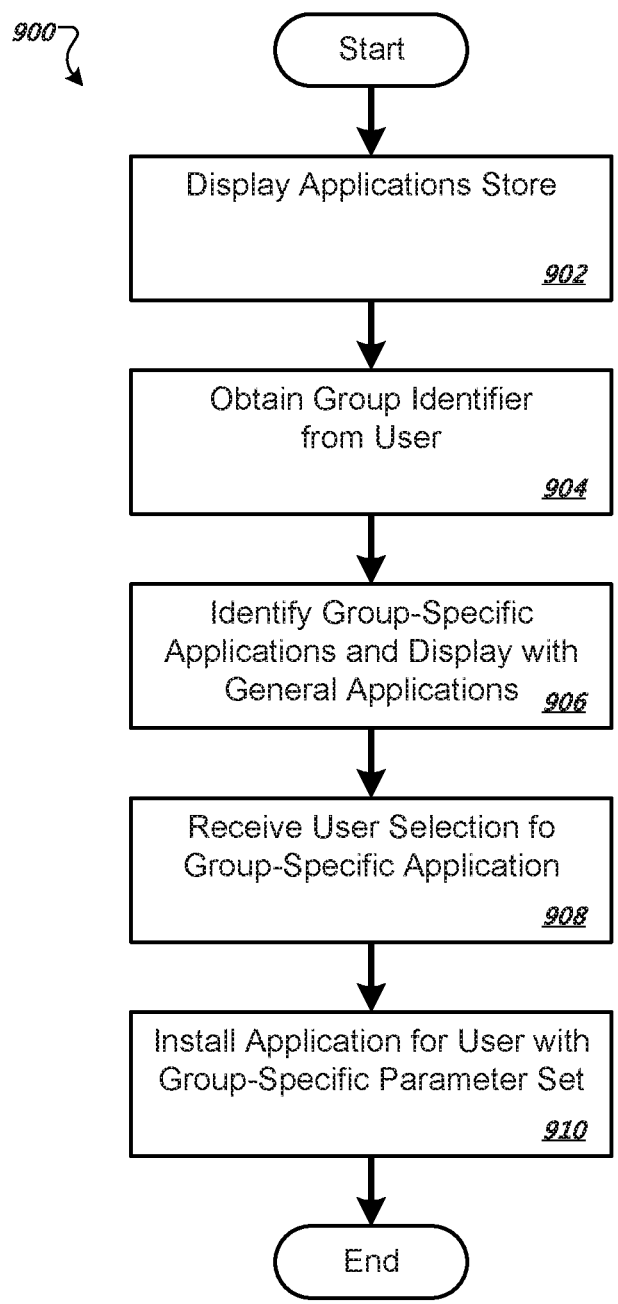
FIG. 9A is a flow chart showing an example of a process for customizing an application.

FIG. 9A is a flowchart of a process 900 for obtaining customization applications from an on-line application source. In general, the process 900 allows a user to indicate a group with which the user is affiliated, to have applications that are supported by that group displayed to the user, and then to have the applications automatically installed for operation on the user's device, where the installation customizes the application according to parameters defined for the group.

For example, a small company may choose to receive reliable computer applications at a low cost by subscribing to a hosting service, where employees may access the service from anywhere that has a Web connection. However, the company may have certain preferences, such as the look and feel of a user interface, applications or features that can be accessed by members of the organization (e.g., a corporation may want to turn off a chat feature of a communication application), and custom data (e.g., corporate contact directories) to be accessed by employees of the company. The mechanisms described here may permit a user, when accessing an on-line service that provides the hosting service, to indicate that they are an employee of the company and to subsequently have all of the settings for the particular user's selected applications set so as to match the preferences of the company.

The process 900 begins at box 902, where an applications store is displayed. Such a store may be any web accessible site where a variety of software applications are available to users for activation or download. One example of such a site is the APPLE APP STORE. The display of the application store may simply involve displaying icons for a number of computing applications that a user can load onto his or her computing device. The user may select a particular application for download by clicking on the icon for such an application, and the downloading and installation of the application on the user's computing device may occur by a variety of techniques.

The user may also be presented with a control, at box 904, that, if selected by the user, may cause the user to be prompted to identify a group with which the user is affiliated. For example, a user may be asked to enter the domain for their group (e.g., www.google.com or www.ibm.com). The user may also simply enter an normal name for the group ("World Wildlife Fund"), and the system may search for a matching name and then correlate it with other identifying information for the organization (e.g., a particular domain).

A representative for the group may have previously registered the group, such as using the GOOGLE APPS FOR YOUR DOMAIN service. Such registration may have resulted in the representative identifying a domain at which data for the group will be stored, the applications that should be made available for the group, various parameters that affect the manner in which those applications are displayed (e.g., selecting a theme and color scheme for the group), and providing data to the system (e.g., linking a document repository to the system and providing a corporate contact list to the system). Thus, at box 906, the process 900 may identify group-specific applications that have been identified as applications that should be made available to members of the group. Such applications may be applications that are available to the general public, but that are provided to members of the group in a customized manner, or applications that are not available to the general public (e.g., applications that were written specifically for the group or applications for which various groups may choose to pay a subscription fee). The process 900 may also cause those applications to be displayed to the user, such as in a manner shown in FIG. 6B, where group-specific applications are shown in a first area of an application store and general applications, which are available to the general public, are shown in a second area. The user may choose to download the same application from either area in some instances, where downloading the application from the group-specific area will cause it to have its parameters established according to the pre-determined standard for the group, such as by pointing it to a particular sub-domain of a hosting service. In contrast, downloading the application from the general area may simply cause the application to be assigned to an account for the particular user, and may obtain parameters associated with the user, but not parameters associated with the particular group.

To obtain such display of applications, the user may initially be required to provide authentication information. For example, the user may have to establish that they are operating using an e-mail address from the domain associated with the group (e.g., by providing their e-mail address, having a token sent to the address by the system, and then providing the token back to the system), or the user may need to log into an account (e.g., with ID and password) that has previously been associated with the group.

At box 908, the process 900 receives a selection by a user of a group-specific application. The user may, for example, click on a icon in the group-specific are of an application store, to indicate that they would like to have the application loaded onto their computing device in a manner that the application is customized for the group. Thus, at box 910, the process 900 installs the application for the user with the group-specific parameters set. Such a process may simply involve associating a URL with an icon for launching the application, where the URL is directed to a domain or subdomain for the group. The installation may alternatively, or in addition, involve a full download and installation of a native application on the device, where the application points to a central server when it is run so as to obtain group-specific parameters for its operation. The parameters may also be copied to the device itself during installation, and an instance of the application loaded onto the device may refer to such local parameters when the application is invoked.

Figure 9B:
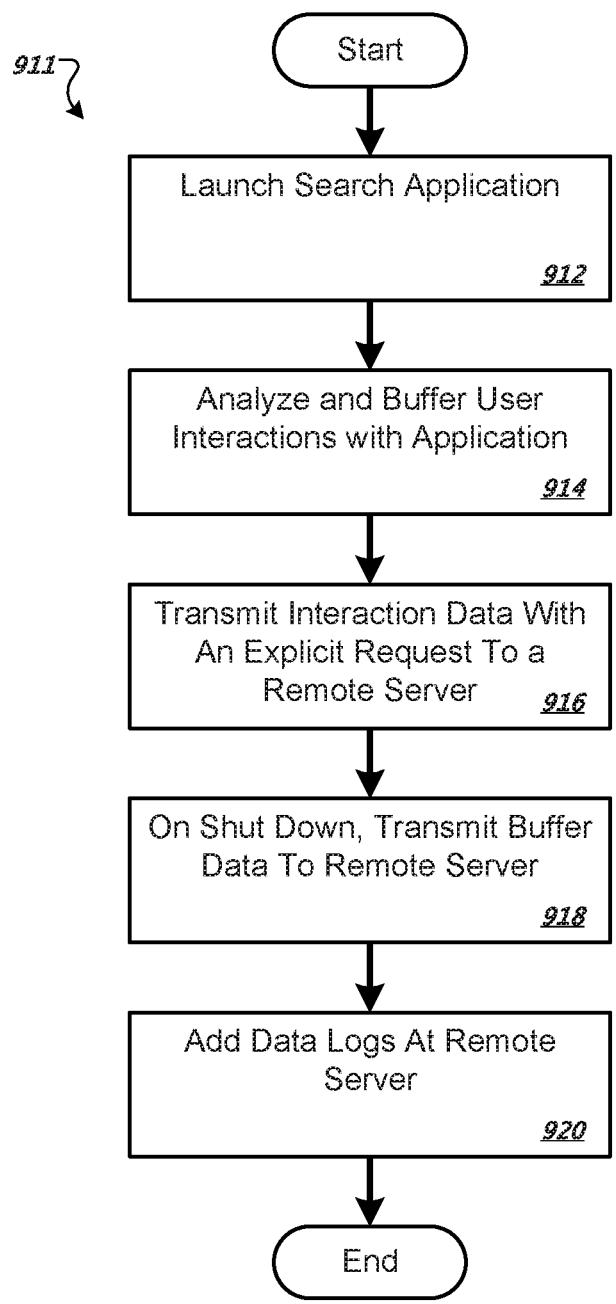
FIG. 9B is a flow chart showing an example of a process for logging interaction information on a computing device.

FIG. 9B is a flowchart shows a process 911 for submitting log data to a remote server. In general, the process 911 involves buffering, on a computing device, data that reflects user interactions with search results. The buffer is then flushed when a program has an explicitly reason to send data to a central server that analyzes log information—where the log information piggy-backs on the transmission of the main data.

The process 911 starts at box 912, where a search application is launched. The application may be, for example, a native application loaded on a mobile computing device such as a smartphone. The search application may operate like the search applications discussed above, including by receiving search queries entered by a user of the device and displaying search results and other information retrieved form the device and from central servers in response to the queries. As a user interacts with the search application, certain actions—such as selection of menu items, clicks on pointing devices, selection of certain search results, time spent by the user at landing sites for certain search results, whether an EULA (end user license agreement) was displayed to a user, keystrokes by a user, the selection of a business listing from a search result set, a call to a business, a selection to search on a particular corpus of information, the selection of a suggestion, the hiding or showing of a keyboard, and other similar actions—may be logged, such as in a string of alphanumeric text, where each action is added to the end of the string. Characters for use as short-hands for each action may be selected according to a standard scheme, and other meta information such as timestamps for certain or all actions may also be recorded.

Such analysis may be an optional feature for the user, so that the user can block the analysis if the user has privacy concerns. Permitting such analysis, however, may allow a system to improve the quality of search results that it delivers to the user. But a user may choose to turn the feature off, and may be provided with notice when the system is set to be turned on. In this manner, the user can control the level of access that is provided to their device by other services. A user may also provide limited access, such as by maintaining privacy over information about the user's location, a cell identifier for the user's device, and other such information. Also, the logged information may be anonymized in various known manners where appropriate.

To lessen the bandwidth needed for logging interaction data from a computer device to a central server, the buffered data may be stored (box 914) until the occurrence of an event that requires transmission of the data or an event that would result in a need for bandwidth in any event. Under the first category, for example, the buffer may be transmitted to a central server when a user closes the search application (see box 918). Under the second category, for example, the buffered data may piggyback on a transmission to a server system that must be made immediately because it is required to provide a user with input in an application hey are currently using (box 916). For example, where a suggestion server corresponds to a logging system, the buffered data may piggy-back on a transmission to the suggestion server.

The server system may use the buffered data (box 920) in various manners when it receives the data. First, the server system may parse and reformat the data so that it can be stored with activity data that was previously received from the same user or device. In addition, where a user has multiple devices on a common account (e.g., a laptop computer and a smart phone), the log data from the two devices may be merged to create a single log for the user. The log data may then be aggregated with similar data from a large number of users, and statistical analysis may be performed to make determinations regarding how users, as a whole, respond to certain search results. As one example, for instance, a search result that has been ranked very highly, but on which user seldom click or for which users return quickly from the landing page (thus indicating that they did not like the result), may be demoted in rank using log data showing that large numbers of users do not react favorable to the search result.

Figure 10:
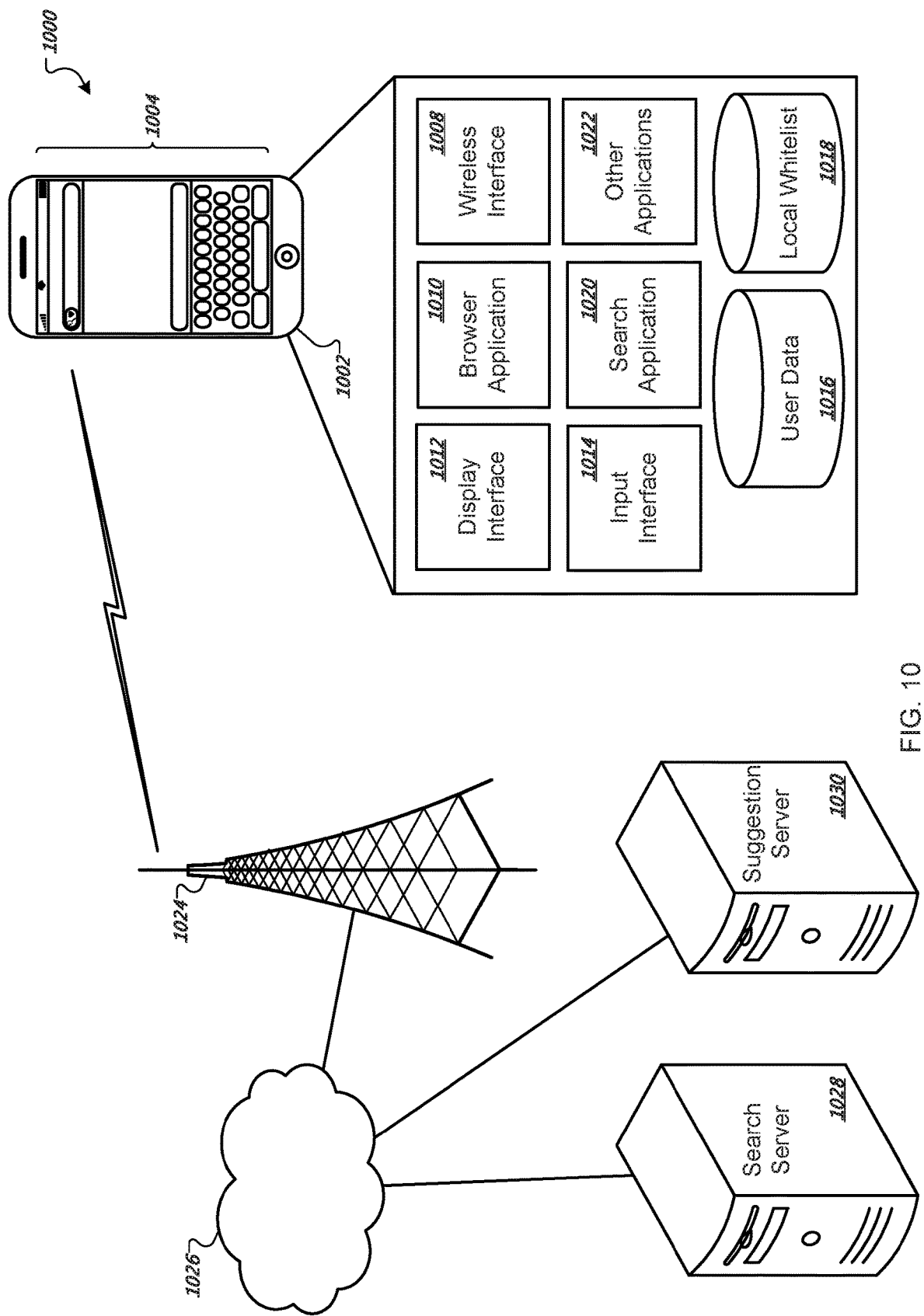
FIG. 10 is a schematic diagram showing an example of a system for interactive search querying.

FIG. 10 is a schematic diagram showing an example of a system 1000 that provides interactive search querying. The system 1000 receives user interactions as touch screen inputs. The system 1000 may be implemented using a mobile device such as a device 1002. The device 1002 includes various input and output mechanisms such as a touch screen display 1004. A number of components within the device 1002 may be configured to provide various selection functionality on the touch screen display 1004, such as the long touch and zooming functionality discussed above.

One such component is a display interface 1012, which may be responsible for rendering content for presentation on the touch screen display 1004. The display interface 1012 may receive graphic-related content from a number of sources and may determine how the content is to be provided to a user. For example, a number of different windows for various applications (e.g., a browser application 1010, a search application 1020, and one or more other applications 1022) on the device 1002 may need to be displayed, and the display interface 1012 may determine which to display, which to hide, and what to display or hide when there is overlap between various graphical objects. The display interface 1012 may also be responsible for displaying icons like those discussed above, that may provide a user with an indication that a particular mode of input is currently in operation for the device 1002.

An input interface 1014 may be responsible for translating commands provided by a user of the device 1002. For example, such commands may come from a keyboard, from the touch screen display 1004, or from other such sources, including dedicated buttons or soft buttons (e.g., buttons whose functions may change over time, and whose functions may be displayed on areas of the touch screen display 1004 that are adjacent to the particular buttons). The input interface 1014 may determine, for example, in what area of the display commands are being received, and thus for which application being shown on the display the commands are intended. In addition, the input interface 1014 may interpret input motions on the touch screen display 1004 into a common format and pass those interpreted motions (e.g., short press, long press, straight-line drags, and inputs involving more than one tap) to the appropriate application. The input interface 1014 may also report such inputs to an event manager (not shown) that in turn reports them to the appropriate modules or applications.

A variety of applications may operate, generally on a common microprocessor, on the device 1002. The applications may take a variety of forms, such as mapping applications, e-mail and other messaging applications, web browser applications, and various applications running within a web browser or running extensions of a web browser. The applications may be components of an operating system for the device or may be traditional applications operating on the operating system. An application such as a mapping application may receive messages from the input interface 1014 when a user makes a selection that is relevant to the particular application, such as by tapping or dragging on a map that is controlled by the mapping application. Other such selections by a user, as discussed above and below, may also be communicated to the mapping application, which may in turn respond through the display interface 1012, to affect the visual interface that is shown to the user.

A wireless interface 1008 manages communication with a wireless network 1024 and a data network 1026. The wireless interface 1008 may operate in a familiar manner, such as according to the examples discussed below, and may provide for communication by the device 1002 with messaging service such as text messaging, e-mail, and telephone voice mail messaging. In addition, the wireless interface 1008 may support downloads and uploads of content and computer code over the wireless network 1024.

Various forms of persistent storage may be provided, such as using fixed disk drives and/or solid state memory devices. Two examples are shown here. First, a user data 1016 includes data representing user interactions with the device 1002. The user data 1016 may include, for example, information regarding items accessed by the user, such as particular contacts in an address book or websites. The search application 1020 can use the user data 1016 to perform search suggestions or the search application 1020 can send the user data 1016 to a suggestion server 1030 for use in determining search suggestions.

Other storage includes a local whitelist 1018, which may be stored on the same media as the user data 1016. The local whitelist 1018 includes words or phrases typically used for local search. In the example relevant here, the search application 1020 can use the local whitelist 1018 to identify local search suggestions based on a search query.

Using the pictured components, and others that are omitted here for clarity, the device 1002 may provide particular actions in response to user inputs. Specifically, the device 1002 may provide interactive search querying, such as updating search suggestions as a user inputs a search query. The user may make an input to select a particular search suggestion. The search suggestion is sent to a search server 1028. The search server 1028 provides the search results to the device 1002 for presentation to the user. In addition, the device 1002 may provide for hiding an operating system rendered soft-displayed keyboard in response to a touch screen select and drag interaction performed by the user.

Figure 11:
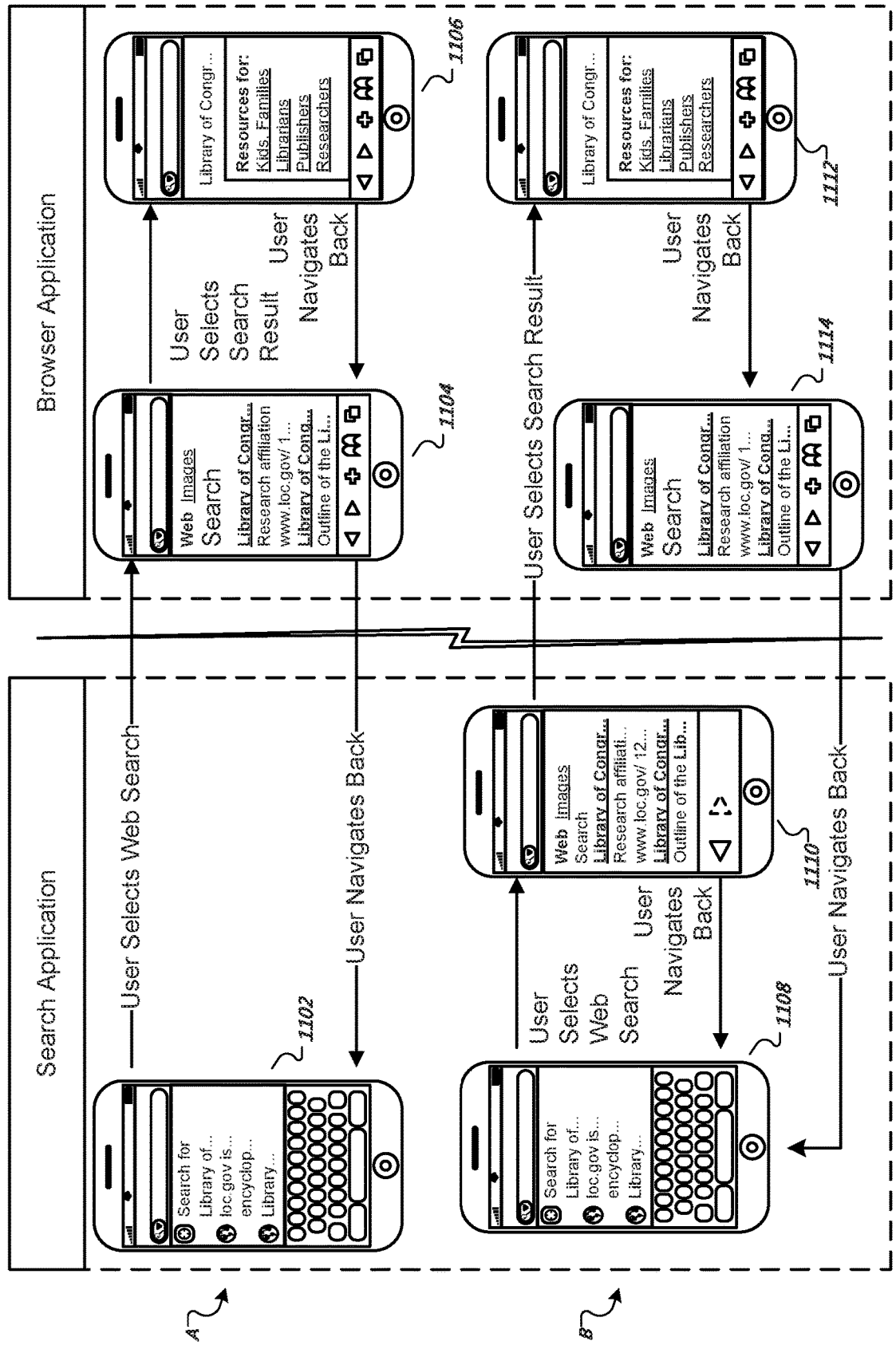
FIG. 11 is a graphical flow diagram showing an example of a process for switching between a search application and a browser application.

FIG. 11 is a graphical flow diagram showing interactions between a native search application and a web browser. In general, the use of a native application for managing search interactions may provide power and flexibility that would not be possible with browser-based applications (because of limitations in the power of browsers and because of security measures that are imposed by browsers on applications running in the browsers). However, users conducting searches ultimate need a browser to review search results, and switching back and forth between the search application and the browser can be distracting for a user. Thus, the process shown here may provide for improved user interaction during a search experience for a user.

A first implementation is shown at (a), where a native search application presents a display 1102 to a user that permits the user to enter search terms into a mobile device. When the user submits a search query, control transfers to the browser application (see 1104) which they shows the search results to the user. If a user selects a link for one of the search results so as to be taken to a landing page for a result, the process stays in the web browser (see 1106).

A second implementation (b) may, in certain implementations, provide benefits over the first implementation. In this implementation, which corresponds to the flow charts shown in FIGS. 7C and 7D, additional functionality is provided by the native search application so as to delay the point at which the process transitions the user to the browser. In particular, a first display 1108 presents a search box in which a user may submit a query. Search results for the query are initially displayed (1110) by the search application, in a manner that is intended to simulate the look of the browser. In this manner, if a user selects a back button on the simulated browser, the user will simply be taking back to the search input screen (1108). Thus, for example, if the user enters a query, sees the results and does not like them, and wants to refine the query, the user need not be taken outside of the search application.

If the user, however, selects a link in a result so as to be taken to a landing page, the process invokes the browser, as shown by display 1112. As discussed above, the search application may first cause the browser to load a "bouncer" page so as to activate the back button on the browser in a manner that selection of the back button once results in the display of the search results in the browser (1114), while selection of the back button another time passes control to the search application (1108). The search application may then display the search input screen so that, for example, the user can refine their query. Or the search application could display the search result display (1110). In any event, the actions described in more detail above may provide a convenient algorithm for transitioning between the native search application and the browser.

Figure 12:
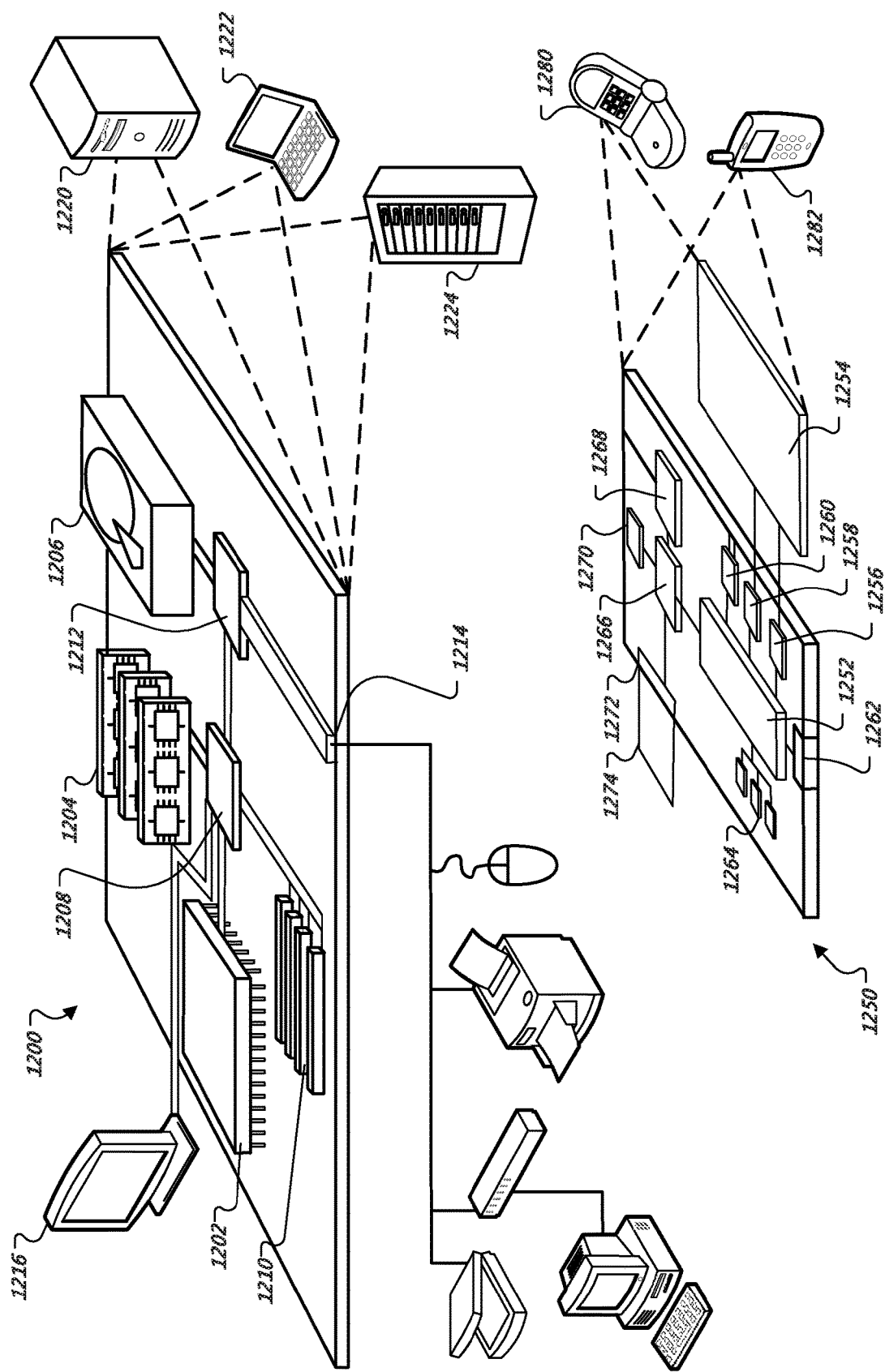
FIG. 12 shows an example of a computing device and a mobile computing device that can be used to implement the techniques described here.

FIG. 12 shows an example of a computing device 1200 and a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, memory on the processor 1202, or a propagated signal.

The high-speed interface 1208 manages bandwidth-intensive operations for the computing device 1200, while the low-speed interface 1212 manages lower bandwidth-intensive operations. Such allocation of functions is exemplary only. In one implementation, the high-speed interface 1208 is coupled to the memory 1204, the display 1216 (e.g., through a graphics processor or accelerator), and to the high-speed expansion ports 1210, which may accept various expansion cards (not shown). In the implementation, the low-speed interface 1212 is coupled to the storage device 1206 and the low-speed expansion port 1214. The low-speed expansion port 1214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. In addition, it may be implemented in a personal computer such as a laptop computer 1222. It may also be implemented as part of a rack server system 1224. Alternatively, components from the computing device 1200 may be combined with other components in a mobile device (not shown), such as a mobile computing device 1250. Each of such devices may contain one or more of the computing device 1200 and the mobile computing device 1250, and an entire system may be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 may also be provided with a storage device, such as a micro-drive or other device, to provide additional storage. Each of the processor 1252, the memory 1264, the display 1254, the communication interface 1266, and the transceiver 1268, are interconnected using various buses, and several of the components may be mounted on a common motherboard or in other manners as appropriate.

The processor 1252 can execute instructions within the mobile computing device 1250, including instructions stored in the memory 1264. The processor 1252 may be implemented as a chipset of chips that include separate and multiple analog and digital processors. The processor 1252 may provide, for example, for coordination of the other components of the mobile computing device 1250, such as control of user interfaces, applications run by the mobile computing device 1250, and wireless communication by the mobile computing device 1250.

The processor 1252 may communicate with a user through a control interface 1258 and a display interface 1256 coupled to the display 1254. The display 1254 may be, for example, a TFT (Thin-Film-Transistor Liquid Crystal Display) display or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may provide communication with the processor 1252, so as to enable near area communication of the mobile computing device 1250 with other devices. The external interface 1262 may provide, for example, for wired communication in some implementations, or for wireless communication in other implementations, and multiple interfaces may also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 may also be provided and connected to the mobile computing device 1250 through an expansion interface 1272, which may include, for example, a SIMM (Single In Line Memory Module) card interface. The expansion memory 1274 may provide extra storage space for the mobile computing device 1250, or may also store applications or other information for the mobile computing device 1250. Specifically, the expansion memory 1274 may include instructions to carry out or supplement the processes described above, and may include secure information also. Thus, for example, the expansion memory 1274 may be provide as a security module for the mobile computing device 1250, and may be programmed with instructions that permit secure use of the mobile computing device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, the expansion memory 1274, memory on the processor 1252, or a propagated signal that may be received, for example, over the transceiver 1268 or the external interface 1262.

The mobile computing device 1250 may communicate wirelessly through the communication interface 1266, which may include digital signal processing circuitry where necessary. The communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through the transceiver 1268 using a radio-frequency. In addition, short-range communication may occur, such as using a Bluetooth, WiFi, or other such transceiver (not shown). In addition, a GPS (Global Positioning System) receiver module 1270 may provide additional navigation- and location-related wireless data to the mobile computing device 1250, which may be used as appropriate by applications running on the mobile computing device 1250.

The mobile computing device 1250 may also communicate audibly using an audio codec 1260, which may receive spoken information from a user and convert it to usable digital information. The audio codec 1260 may likewise generate audible sound for a user, such as through a speaker, e.g., in a handset of the mobile computing device 1250. Such sound may include sound from voice telephone calls, may include recorded sound (e.g., voice messages, music files, etc.) and may also include sound generated by applications operating on the mobile computing device 1250.

The mobile computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of what has been described. For example, various forms of the flows shown above may be used, with steps re-ordered, added, or removed. Also, although several applications of the search systems and methods have been described, it should be recognized that numerous other applications are contemplated. Accordingly, other embodiments are within the scope of the following claims.

What is claimed is:

1. A method comprising:
   receiving, at a search application on a mobile computing device, one or more characters entered at a search entry screen of the search application, the one or more characters forming a partial user search query;
   displaying, in a search results display of the search application, a plurality of suggestions responsive to the partial user search query, the plurality of suggestions including a first suggestion identified using a first corpus of searchable information and a second suggestion identified using a second corpus of searchable information, wherein the first corpus is associated with a first source and the second corpus is associated with a second source, a first visual indication associated with the first corpus is displayed in connection with the first suggestion, and a second visual indication associated with the second corpus is displayed in connection with the second suggestion, the first visual indication being different from the second visual indication;
   receiving, at the search application, an additional character entered at the search entry screen, the additional character being appended to the one or more characters previously entered at the search entry screen to form an updated partial user search query;

displaying, in the search results display of the search application, an updated plurality of suggestions responsive to the updated partial user search query, the updated plurality of suggestions including a third suggestion identified using the first corpus of searchable information, wherein the first visual indication associated with the first corpus is displayed in connection with the third suggestion;

receiving, at the search application, input indicating a selection of the first corpus; and responsive to receiving the input indicating the selection of the first corpus:

updating to remove, from the search results display of the search application, the second suggestion identified using the second corpus of searchable information; and displaying, in the search results display of the search application, a fourth suggestion identified using the first corpus of searchable information, while continuing displaying the third suggestion.

2. The method according to claim 1, wherein displaying the updated plurality of suggestions responsive to the updated partial user search query is performed without receiving any indication from a user that a search query is complete.

3. The method according to claim 2, wherein displaying the updated plurality of suggestions responsive to the updated partial user search query comprises removing, from display, suggestions that are included in the plurality of suggestions but that are not included in the updated plurality of suggestions.

4. The method according to claim 3, wherein:

the updated plurality of suggestions further includes a fifth suggestion identified using the second corpus of searchable information; and displaying the updated plurality of suggestions responsive to the updated partial user search query comprises displaying the second visual indication associated with the second corpus in connection with the fifth suggestion.

5. The method according to claim 1, wherein:

the first corpus of searchable information is locally stored; and the second corpus of searchable information is from a remote search engine.

6. The method according to claim 1, wherein the first corpus of searchable information includes previous search queries.

7. The method according to claim 1, wherein the first corpus of searchable information includes favorites.

8. The method according to claim 1, wherein the first visual indication comprises a first icon, and the second visual indication comprises a second icon, the second icon being different from the first icon.

9. A computer program product comprising one or more non-transitory computer-readable storage media having program instructions collectively stored on the one or more computer-readable storage media, the program instructions executable to:

receive, at a search application on a mobile computing device, one or more characters entered at a search entry screen of the search application, the one or more characters forming a partial user search query;

display, in a search results display of the search application, a plurality of suggestions responsive to the partial user search query, the plurality of suggestions including a first suggestion identified using a first corpus of searchable information and a second suggestion identified using a second corpus of searchable information, wherein the first corpus is associated with a first source and the second corpus is associated with a second source, a first visual indication associated with the first corpus is displayed in connection with the first suggestion, and a second visual indication associated with the second corpus is displayed in connection with the second suggestion, the first visual indication being different from the second visual indication;

receive, at the search application, an additional character entered at the search entry screen, the additional character being appended to the one or more characters previously entered at the search entry screen to form an updated partial user search query;

display, in the search results display of the search application, an updated plurality of suggestions responsive to the updated partial user search query, the updated plurality of suggestions including a third suggestion identified using the first corpus of searchable information, wherein the first visual indication associated with the first corpus is displayed in connection with the third suggestion;

receive, at the search application, input indicating a selection of the first corpus; and responsive to receiving the input indicating the selection of the first corpus:

update to remove, from the search results display of the search application, the second suggestion identified using the second corpus of searchable information; and display, in the search results display of the search application, a fourth suggestion identified using the first corpus of searchable information, while continuing displaying the third suggestion.

10. The computer program product according to claim 9, wherein displaying the updated plurality of suggestions responsive to the updated partial user search query is performed without receiving any indication from a user that a search query is complete.

11. The computer program product according to claim 10, wherein displaying the updated plurality of suggestions responsive to the updated partial user search query comprises removing, from display, suggestions that are included in the plurality of suggestions but that are not included in the updated plurality of suggestions.

12. The computer program product according to claim 11, wherein:

the updated plurality of suggestions further includes a fifth suggestion identified using the second corpus of searchable information; and displaying the updated plurality of suggestions responsive to the updated partial user search query comprises displaying the second visual indication associated with the second corpus in connection with the fifth suggestion.

13. The computer program product according to claim 9, wherein:

the first corpus of searchable information is locally stored; and the second corpus of searchable information is remotely stored.

14. The computer program product according to claim 9, wherein the first corpus of searchable information includes previous search queries.

15. The computer program product according to claim 9, wherein the first corpus of searchable information includes favorites.

16. The computer program product according to claim 9, wherein the first visual indication comprises a first icon, and the second visual indication comprises a second icon, the second icon being different from the first icon.

17. A system comprising:
one or more processors;
one or more computer-readable storage media, and program instructions collectively stored on the one or more computer-readable storage media, the program instructions executable by one or more of the processors to:
receive, at a search application on a mobile computing device, one or more characters entered at a search entry screen of the search application, the one or more characters forming a partial user search query;
display, in a search results display of the search application, a plurality of suggestions responsive to the partial user search query, the plurality of suggestions including a first suggestion identified using a first corpus of searchable information and a second suggestion identified using a second corpus of searchable information, wherein the first corpus is associated with a first source and the second corpus is associated with a second source, a first visual indication associated with the first corpus is displayed in connection with the first suggestion, and a second visual indication associated with the second corpus is displayed in connection with the second suggestion, the first visual indication being different from the second visual indication;
receive, at the search application, an additional character entered at the search entry screen, the additional character being appended to the one or more characters previously entered at the search entry screen to form an updated partial user search query;
display, in the search results display of the search application, an updated plurality of suggestions responsive to the updated partial user search query, the updated plurality of suggestions including a third suggestion identified using the first corpus of searchable information, wherein the first visual indication associated with the first corpus is displayed in connection with the third suggestion;
receive, at the search application, input indicating a selection of the first corpus; and
responsive to receiving the input indicating the selection of the first corpus:
update to remove, from the search results display of the search application, the second suggestion identified using the second corpus of searchable information; and
display, in the search results display of the search application, a fourth suggestion identified using the first corpus of searchable information, while continuing displaying the third suggestion.

18. The system according to claim 17, wherein in displaying the updated plurality of suggestions responsive to the updated partial user search query one or more of the processors are to display the updated plurality of suggestions without receiving any indication from a user that a search query is complete.

19. The system according to claim 18, wherein in displaying the updated plurality of suggestions responsive to the updated partial user search query one or more of the processors are to remove, from display, suggestions that are included in the plurality of suggestions but that are not included in the updated plurality of suggestions.

20. The system according to claim 19, wherein:
the updated plurality of suggestions further includes a fifth suggestion identified using the second corpus of searchable information; and
in displaying the updated plurality of suggestions responsive to the updated partial user search query one or more of the processors are to display the second visual indication associated with the second corpus in connection with the fifth suggestion.

21. The system according to claim 17, wherein:
the first corpus of searchable information is locally stored; and
the second corpus of searchable information is remotely stored.

22. The system according to claim 17, wherein the first corpus of searchable information includes previous search queries.

23. The system according to claim 22, wherein the first corpus of searchable information includes favorites.

24. The system according to claim 17, wherein the first visual indication comprises a first icon, and the second visual indication comprises a second icon, the second icon being different from the first icon.

25. The method according to claim 1, wherein the first corpus is associated with a first domain and the second corpus is associated with a second domain.

26. The method according to claim 1, wherein the first corpus is associated with a first type of searchable information and the second corpus is associated with a second type of searchable information.

27. The method according to claim 1, wherein the input indicating the selection of the first corpus comprises a touch input associated with the first visual indication.

* * * * *